(12) United States Patent
Kim et al.

(10) Patent No.: US 11,093,752 B2
(45) Date of Patent: Aug. 17, 2021

(54) OBJECT TRACKING IN MULTI-VIEW VIDEO

(71) Applicant: Apple Inc., Cupertino, CA (US)

(72) Inventors: Jae Hoon Kim, San Jose, CA (US); Ming Chen, Cupertino, CA (US); Hang Yuan, San Jose, CA (US); Jiefu Zhai, San Jose, CA (US); Dazhong Zhang, Milpitas, CA (US); Xiaosong Zhou, Campbell, CA (US); Chris Chung, Sunnyvale, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/613,130

(22) Filed: Jun. 2, 2017

(65) Prior Publication Data

US 2018/0349705 A1 Dec. 6, 2018

(51) Int. Cl.
*G06K 9/00* (2006.01)
*G06T 7/292* (2017.01)
*G06K 9/32* (2006.01)

(52) U.S. Cl.
CPC ..... *G06K 9/00744* (2013.01); *G06K 9/00718* (2013.01); *G06K 9/3241* (2013.01); *G06T 7/292* (2017.01); *G06T 2207/10016* (2013.01)

(58) Field of Classification Search
CPC . G06T 7/70; G06T 7/292; G06T 2207/10016; H04N 13/194; G06K 9/00718; G06K 9/00744; G06K 9/3241
See application file for complete search history.

(56) References Cited

U.S. PATENT DOCUMENTS

| 4,890,257 A | 12/1989 | Anthias et al. |
| 5,185,667 A | 2/1993 | Zimmerman |
| 5,262,777 A | 11/1993 | Low et al. |
| 5,313,306 A | 5/1994 | Kuban et al. |
| 5,359,363 A | 10/1994 | Kuban et al. |

(Continued)

FOREIGN PATENT DOCUMENTS

| EP | 2077525 A1 | 7/2009 |
| JP | 2008-193458 A | 8/2008 |

(Continued)

OTHER PUBLICATIONS

He et al.; "AHG8: InterDigital's projection format conversion tool"; Joint Video Exploration Team (JVET) of ITU-T SG 16 WP3 and ISO/IEC JTC 1/SC 29/WG 11 4th meeting; Oct. 2016; 18 pages.

(Continued)

*Primary Examiner* — Nay A Maung
*Assistant Examiner* — Jose M Torres
(74) *Attorney, Agent, or Firm* — BakerHostetler

(57) ABSTRACT

Techniques are disclosed for managing display of content from multi-view video data. According to these techniques, an object may be identified from content of the multi-view video. The object's location may be tracked across a sequence of multi-view video. The technique may extract a sub-set of video that is contained within a view window that is shifted in an image space of the multi-view video in correspondence to the tracked object's location. These techniques may be implemented either in an image source device or an image sink device.

22 Claims, 7 Drawing Sheets

(56) References Cited

U.S. PATENT DOCUMENTS

| | | |
|---|---|---|
| 5,448,687 A | 9/1995 | Hoogerhyde et al. |
| 5,537,155 A | 7/1996 | O'Connell et al. |
| 5,600,346 A | 2/1997 | Kamata et al. |
| 5,684,937 A | 11/1997 | Oxaal |
| 5,689,800 A | 11/1997 | Downs |
| 5,715,016 A | 2/1998 | Kobayashi et al. |
| 5,787,207 A | 7/1998 | Golin |
| 5,872,604 A | 2/1999 | Ogura |
| 5,903,270 A | 5/1999 | Gentry et al. |
| 5,936,630 A | 8/1999 | Oxaal |
| 6,011,897 A | 1/2000 | Koyama et al. |
| 6,031,540 A | 2/2000 | Golin et al. |
| 6,043,837 A * | 3/2000 | Driscoll, Jr. ......... H04N 5/2628 348/36 |
| 6,058,212 A | 5/2000 | Yokoyama |
| 6,122,317 A | 9/2000 | Hanami et al. |
| 6,144,890 A | 11/2000 | Rothkop |
| 6,204,854 B1 | 3/2001 | Signes et al. |
| 6,219,089 B1 | 4/2001 | Driscoll, Jr. et al. |
| 6,222,883 B1 | 4/2001 | Murdock et al. |
| 6,317,159 B1 | 11/2001 | Aoyama |
| 6,331,869 B1 | 12/2001 | Furlan et al. |
| 6,426,774 B1 | 7/2002 | Driscoll, Jr. et al. |
| 6,535,643 B1 | 3/2003 | Hong |
| 6,539,060 B1 | 3/2003 | Lee et al. |
| 6,559,853 B1 | 5/2003 | Hashimoto et al. |
| 6,577,335 B2 | 6/2003 | Kobayashi et al. |
| 6,751,347 B2 | 6/2004 | Pettigrew et al. |
| 6,762,789 B1 * | 7/2004 | Sogabe ................ G06F 3/14 348/36 |
| 6,769,131 B1 | 7/2004 | Tanaka et al. |
| 6,795,113 B1 | 9/2004 | Jackson et al. |
| 6,907,310 B2 | 6/2005 | Gardner et al. |
| 6,973,130 B1 | 12/2005 | Wee et al. |
| 6,993,201 B1 | 1/2006 | Haskell et al. |
| 7,006,707 B2 | 2/2006 | Peterson |
| 7,015,954 B1 | 3/2006 | Foote et al. |
| 7,039,113 B2 | 5/2006 | Soundararajan |
| 7,050,085 B1 | 5/2006 | Park et al. |
| 7,095,905 B1 | 8/2006 | Peterson |
| 7,123,777 B2 | 10/2006 | Rondinelli et al. |
| 7,139,440 B2 | 11/2006 | Rondinelli et al. |
| 7,149,549 B1 | 12/2006 | Ortiz et al. |
| 7,259,760 B1 | 8/2007 | Hashimoto et al. |
| 7,327,787 B1 | 2/2008 | Chen et al. |
| 7,382,399 B1 | 6/2008 | McCall et al. |
| 7,385,995 B2 | 6/2008 | Stiscia et al. |
| 7,415,356 B1 | 8/2008 | Gowda et al. |
| 7,433,535 B2 | 10/2008 | Mukherjee et al. |
| 7,450,749 B2 | 11/2008 | Rouet et al. |
| 7,593,041 B2 | 9/2009 | Novak et al. |
| 7,620,261 B2 | 11/2009 | Chiang et al. |
| 7,660,245 B1 | 2/2010 | Luby |
| 7,742,073 B1 | 6/2010 | Cohen-Solal et al. |
| 7,755,667 B2 | 7/2010 | Rabbani et al. |
| 7,782,357 B2 | 8/2010 | Cutler |
| 8,027,473 B2 | 9/2011 | Stiscia et al. |
| 8,045,615 B2 | 10/2011 | Liang et al. |
| 8,217,956 B1 | 7/2012 | Jin |
| 8,255,552 B2 | 8/2012 | Witt et al. |
| 8,270,496 B2 | 9/2012 | Yin et al. |
| 8,295,360 B1 | 10/2012 | Lewis et al. |
| 8,339,394 B1 | 12/2012 | Lininger |
| 8,442,109 B2 | 5/2013 | Wang et al. |
| 8,442,311 B1 | 5/2013 | Hobbs et al. |
| 8,462,109 B2 | 6/2013 | Nasiri et al. |
| 8,462,853 B2 | 6/2013 | Jeon et al. |
| 8,482,595 B2 | 7/2013 | Kweon |
| 8,682,091 B2 | 3/2014 | Amit et al. |
| 8,693,537 B2 | 4/2014 | Wang et al. |
| 8,711,941 B2 | 4/2014 | Letunovskiy et al. |
| 9,013,536 B2 | 4/2015 | Zhu et al. |
| 9,071,484 B1 | 6/2015 | Traux |
| 9,094,681 B1 | 7/2015 | Wilkins et al. |
| 9,098,870 B2 | 8/2015 | Meadow et al. |
| 9,219,919 B2 | 12/2015 | Deshpande |
| 9,224,247 B2 | 12/2015 | Wada et al. |
| 9,258,520 B2 | 2/2016 | Lee |
| 9,277,122 B1 | 3/2016 | Imura et al. |
| 9,404,764 B2 | 8/2016 | Lynch |
| 9,430,873 B2 | 8/2016 | Nakamura et al. |
| 9,510,007 B2 | 11/2016 | Chan et al. |
| 9,516,225 B2 | 12/2016 | Banta et al. |
| 9,569,669 B2 * | 2/2017 | Kritt .................. H04N 7/181 |
| 9,596,899 B2 | 3/2017 | Stahl et al. |
| 9,639,935 B1 | 5/2017 | Douady-Pleven et al. |
| 9,723,223 B1 | 8/2017 | Banta et al. |
| 9,743,060 B1 * | 8/2017 | Matias ............... H04N 5/23238 |
| 9,754,413 B1 | 9/2017 | Gray |
| 9,781,356 B1 | 10/2017 | Banta et al. |
| 9,823,835 B2 * | 11/2017 | Wang .................. G06F 3/0488 |
| 9,838,687 B1 | 12/2017 | Banta et al. |
| 9,866,815 B2 | 1/2018 | Vrcelj et al. |
| 9,936,204 B1 | 4/2018 | Sim et al. |
| 9,967,563 B2 | 5/2018 | Hsu et al. |
| 9,967,577 B2 | 5/2018 | Wu et al. |
| 9,992,502 B2 | 6/2018 | Abbas et al. |
| 9,996,945 B1 * | 6/2018 | Holzer ............... G06K 9/00671 |
| 10,102,611 B1 | 10/2018 | Murtha et al. |
| 10,204,658 B2 | 2/2019 | Krishnan |
| 10,212,456 B2 | 2/2019 | Guo et al. |
| 10,264,282 B2 | 4/2019 | Huang et al. |
| 10,277,897 B1 | 4/2019 | Mukherjee et al. |
| 10,282,814 B2 | 5/2019 | Lin et al. |
| 10,306,186 B2 | 5/2019 | Chuang et al. |
| 10,321,109 B1 | 6/2019 | Tanumihardja et al. |
| 10,334,222 B2 | 6/2019 | Kokare et al. |
| 10,339,627 B2 | 7/2019 | Abbas et al. |
| 10,339,688 B2 | 7/2019 | Su et al. |
| 10,349,068 B1 | 7/2019 | Banta et al. |
| 10,375,371 B2 | 8/2019 | Xu et al. |
| 10,455,238 B2 | 10/2019 | Mody et al. |
| 10,523,913 B2 | 12/2019 | Kim et al. |
| 10,559,121 B1 | 2/2020 | Moudgil et al. |
| 10,573,060 B1 | 2/2020 | Ascolese et al. |
| 10,574,997 B2 | 2/2020 | Chung et al. |
| 10,593,012 B2 | 3/2020 | Lee et al. |
| 10,614,609 B2 | 4/2020 | Shih et al. |
| 10,642,041 B2 * | 5/2020 | Han .................. G02B 27/017 |
| 10,643,370 B2 | 5/2020 | Lin et al. |
| 10,652,284 B2 * | 5/2020 | Liu .................. H04L 65/4084 |
| 10,728,546 B2 | 7/2020 | Leontaris et al. |
| 10,740,618 B1 * | 8/2020 | Karlsson ............ H04N 21/2353 |
| 2001/0006376 A1 * | 7/2001 | Numa .................. G02B 27/017 345/7 |
| 2001/0028735 A1 | 10/2001 | Pettigrew et al. |
| 2001/0036303 A1 | 11/2001 | Maurincomme et al. |
| 2002/0080878 A1 | 6/2002 | Li |
| 2002/0093670 A1 | 7/2002 | Luo et al. |
| 2002/0126129 A1 | 9/2002 | Snyder et al. |
| 2002/0140702 A1 | 10/2002 | Koller et al. |
| 2002/0141498 A1 | 10/2002 | Martins |
| 2002/0190980 A1 | 12/2002 | Gerritsen et al. |
| 2002/0196330 A1 * | 12/2002 | Park ................ G08B 13/19608 348/49 |
| 2003/0098868 A1 | 5/2003 | Fujiwara et al. |
| 2003/0099294 A1 | 5/2003 | Wang et al. |
| 2003/0152146 A1 | 8/2003 | Lin et al. |
| 2004/0022322 A1 | 2/2004 | Dye |
| 2004/0028133 A1 | 2/2004 | Subramaniyan et al. |
| 2004/0028134 A1 | 2/2004 | Subramaniyan et al. |
| 2004/0032906 A1 | 2/2004 | Lillig et al. |
| 2004/0056900 A1 | 3/2004 | Blume |
| 2004/0189675 A1 * | 9/2004 | Pretlove ................. B25J 9/1656 345/633 |
| 2004/0201608 A1 | 10/2004 | Ma et al. |
| 2004/0218099 A1 | 11/2004 | Washington |
| 2004/0227766 A1 | 11/2004 | Chou et al. |
| 2004/0247173 A1 | 12/2004 | Nielsen et al. |
| 2005/0013498 A1 | 1/2005 | Srinivasan et al. |
| 2005/0041023 A1 | 2/2005 | Green |
| 2005/0069682 A1 | 3/2005 | Tseng |
| 2005/0129124 A1 | 6/2005 | Ha |
| 2005/0204113 A1 | 9/2005 | Harper et al. |

(56) References Cited

U.S. PATENT DOCUMENTS

| | | |
|---|---|---|
| 2005/0243915 A1 | 11/2005 | Kwon et al. |
| 2005/0244063 A1 | 11/2005 | Kwon et al. |
| 2006/0034527 A1 | 2/2006 | Gritsevich |
| 2006/0055699 A1 | 3/2006 | Perlman et al. |
| 2006/0055706 A1 | 3/2006 | Perlman et al. |
| 2006/0110062 A1 | 5/2006 | Chiang et al. |
| 2006/0119599 A1 | 6/2006 | Woodbury |
| 2006/0126719 A1 | 6/2006 | Wilensky |
| 2006/0132482 A1 | 6/2006 | Oh |
| 2006/0165164 A1 | 7/2006 | Kwan et al. |
| 2006/0165181 A1 | 7/2006 | Kwan et al. |
| 2006/0204043 A1 | 9/2006 | Takei |
| 2006/0238445 A1 | 10/2006 | Wang et al. |
| 2006/0282855 A1 | 12/2006 | Margulis |
| 2007/0024705 A1 | 2/2007 | Richter et al. |
| 2007/0057943 A1 | 3/2007 | Beda et al. |
| 2007/0064120 A1 | 3/2007 | Didow et al. |
| 2007/0071100 A1 | 3/2007 | Shi et al. |
| 2007/0097268 A1 | 5/2007 | Relan et al. |
| 2007/0115841 A1 | 5/2007 | Taubman et al. |
| 2007/0223582 A1 | 9/2007 | Borer |
| 2007/0263722 A1 | 11/2007 | Fukuzawa |
| 2007/0291143 A1 | 12/2007 | Barbieri et al. |
| 2008/0036875 A1* | 2/2008 | Jones ............... H04N 5/23238 348/222.1 |
| 2008/0044104 A1 | 2/2008 | Gering |
| 2008/0049991 A1 | 2/2008 | Gering |
| 2008/0077953 A1 | 3/2008 | Fernandez et al. |
| 2008/0118180 A1 | 5/2008 | Kamiya et al. |
| 2008/0184128 A1 | 7/2008 | Swenson et al. |
| 2008/0252717 A1 | 10/2008 | Moon et al. |
| 2008/0310513 A1 | 12/2008 | Ma et al. |
| 2009/0040224 A1 | 2/2009 | Igarashi et al. |
| 2009/0123088 A1 | 5/2009 | Kallay et al. |
| 2009/0153577 A1 | 6/2009 | Ghyme et al. |
| 2009/0190858 A1 | 7/2009 | Moody et al. |
| 2009/0219280 A1 | 9/2009 | Maillot |
| 2009/0219281 A1 | 9/2009 | Maillot |
| 2009/0251530 A1* | 10/2009 | Cilia ..................... B60R 11/04 348/39 |
| 2009/0262838 A1 | 10/2009 | Gholmieh et al. |
| 2010/0029339 A1 | 2/2010 | Kim et al. |
| 2010/0061451 A1 | 3/2010 | Fuchigami |
| 2010/0079605 A1 | 4/2010 | Wang et al. |
| 2010/0080287 A1 | 4/2010 | Ali |
| 2010/0110481 A1 | 5/2010 | Do et al. |
| 2010/0124274 A1 | 5/2010 | Cheok et al. |
| 2010/0135389 A1 | 6/2010 | Tanizawa et al. |
| 2010/0215226 A1 | 8/2010 | Kaufman et al. |
| 2010/0305909 A1 | 12/2010 | Wolper et al. |
| 2010/0316129 A1 | 12/2010 | Zhao et al. |
| 2010/0329361 A1 | 12/2010 | Choi et al. |
| 2010/0329362 A1 | 12/2010 | Choi et al. |
| 2011/0058055 A1 | 3/2011 | Lindahl et al. |
| 2011/0090967 A1 | 4/2011 | Chen et al. |
| 2011/0128350 A1* | 6/2011 | Oliver .................. H04N 5/232 348/36 |
| 2011/0142306 A1 | 6/2011 | Nair |
| 2011/0194617 A1 | 8/2011 | Kumar et al. |
| 2011/0200100 A1 | 8/2011 | Kim et al. |
| 2011/0235706 A1 | 9/2011 | Demircin et al. |
| 2011/0274158 A1 | 11/2011 | Fu et al. |
| 2011/0305274 A1 | 12/2011 | Fu et al. |
| 2011/0310089 A1* | 12/2011 | Petersen ............... G06Q 30/00 345/419 |
| 2012/0082232 A1 | 4/2012 | Rojals et al. |
| 2012/0098926 A1 | 4/2012 | Kweon |
| 2012/0192115 A1 | 7/2012 | Falchuk et al. |
| 2012/0219055 A1 | 8/2012 | He et al. |
| 2012/0230392 A1 | 9/2012 | Zheng et al. |
| 2012/0260217 A1 | 10/2012 | Celebisoy |
| 2012/0263231 A1 | 10/2012 | Zhou |
| 2012/0307746 A1 | 12/2012 | Hammerschmidt et al. |
| 2012/0320169 A1* | 12/2012 | Bathiche ............. H04N 13/398 348/53 |
| 2012/0320984 A1 | 12/2012 | Zhou |
| 2012/0327172 A1 | 12/2012 | El-Saban et al. |
| 2013/0003858 A1 | 1/2013 | Sze |
| 2013/0016783 A1 | 1/2013 | Kim et al. |
| 2013/0044108 A1 | 2/2013 | Tanaka et al. |
| 2013/0051452 A1 | 2/2013 | Li et al. |
| 2013/0051467 A1 | 2/2013 | Zhou et al. |
| 2013/0088491 A1 | 4/2013 | Hobbs et al. |
| 2013/0094568 A1 | 4/2013 | Hsu et al. |
| 2013/0101025 A1 | 4/2013 | Van der Auwera et al. |
| 2013/0101042 A1 | 4/2013 | Sugio et al. |
| 2013/0111399 A1 | 5/2013 | Rose |
| 2013/0124156 A1 | 5/2013 | Wolper et al. |
| 2013/0127844 A1 | 5/2013 | Koeppel et al. |
| 2013/0128986 A1 | 5/2013 | Tsai et al. |
| 2013/0136174 A1 | 5/2013 | Xu et al. |
| 2013/0170726 A1 | 7/2013 | Kaufman et al. |
| 2013/0182775 A1 | 7/2013 | Wang et al. |
| 2013/0195183 A1 | 8/2013 | Zhai et al. |
| 2013/0208787 A1 | 8/2013 | Zheng et al. |
| 2013/0219012 A1 | 8/2013 | Suresh et al. |
| 2013/0251028 A1 | 9/2013 | Au et al. |
| 2013/0272415 A1 | 10/2013 | Zhou |
| 2013/0301706 A1 | 11/2013 | Qiu et al. |
| 2014/0002439 A1 | 1/2014 | Lynch |
| 2014/0003450 A1 | 1/2014 | Bentley et al. |
| 2014/0010293 A1 | 1/2014 | Srinivasan et al. |
| 2014/0078263 A1* | 3/2014 | Kim ..................... G06T 7/2093 348/47 |
| 2014/0082054 A1 | 3/2014 | Denoual et al. |
| 2014/0089326 A1 | 3/2014 | Lin et al. |
| 2014/0140401 A1 | 5/2014 | Lee et al. |
| 2014/0153636 A1 | 6/2014 | Esenlik et al. |
| 2014/0169469 A1 | 6/2014 | Bernal et al. |
| 2014/0176542 A1 | 6/2014 | Shohara et al. |
| 2014/0218356 A1 | 8/2014 | Distler et al. |
| 2014/0254949 A1 | 9/2014 | Chou |
| 2014/0267235 A1* | 9/2014 | DeJohn ..................... G06F 3/01 345/419 |
| 2014/0269899 A1 | 9/2014 | Park et al. |
| 2014/0286410 A1 | 9/2014 | Zenkich |
| 2014/0355667 A1 | 12/2014 | Lei et al. |
| 2014/0368669 A1 | 12/2014 | Talvala et al. |
| 2014/0376634 A1 | 12/2014 | Guo et al. |
| 2015/0003525 A1 | 1/2015 | Sasai et al. |
| 2015/0003725 A1 | 1/2015 | Wan |
| 2015/0016522 A1 | 1/2015 | Sato |
| 2015/0029294 A1 | 1/2015 | Lin et al. |
| 2015/0062292 A1 | 3/2015 | Kweon |
| 2015/0089348 A1 | 3/2015 | Jose |
| 2015/0103884 A1 | 4/2015 | Ramasubramonian et al. |
| 2015/0145966 A1 | 5/2015 | Krieger et al. |
| 2015/0195491 A1 | 7/2015 | Shaburov et al. |
| 2015/0195559 A1 | 7/2015 | Chen et al. |
| 2015/0195573 A1 | 7/2015 | Aflaki et al. |
| 2015/0215631 A1 | 7/2015 | Zhou et al. |
| 2015/0237370 A1 | 8/2015 | Zhou et al. |
| 2015/0256839 A1 | 9/2015 | Ueki et al. |
| 2015/0264259 A1 | 9/2015 | Raghoebardajal et al. |
| 2015/0264386 A1 | 9/2015 | Pang et al. |
| 2015/0264404 A1 | 9/2015 | Hannuksela |
| 2015/0271517 A1 | 9/2015 | Pang et al. |
| 2015/0279087 A1 | 10/2015 | Myers et al. |
| 2015/0279121 A1 | 10/2015 | Myers et al. |
| 2015/0304665 A1 | 10/2015 | Hannuksela et al. |
| 2015/0321103 A1 | 11/2015 | Barnett et al. |
| 2015/0326865 A1 | 11/2015 | Yin et al. |
| 2015/0339853 A1 | 11/2015 | Wolper et al. |
| 2015/0341552 A1 | 11/2015 | Chen et al. |
| 2015/0346812 A1 | 12/2015 | Cole et al. |
| 2015/0346832 A1* | 12/2015 | Cole ................... H04L 65/4069 345/156 |
| 2015/0350673 A1 | 12/2015 | Hu et al. |
| 2015/0351477 A1 | 12/2015 | Stahl et al. |
| 2015/0358612 A1 | 12/2015 | Sandrew et al. |
| 2015/0358613 A1 | 12/2015 | Sandrew et al. |
| 2015/0358633 A1 | 12/2015 | Choi et al. |

(56) References Cited

U.S. PATENT DOCUMENTS

| | | |
|---|---|---|
| 2015/0373334 A1 | 12/2015 | Rapaka et al. |
| 2015/0373372 A1 | 12/2015 | He et al. |
| 2016/0012855 A1 | 1/2016 | Krishnan |
| 2016/0014422 A1 | 1/2016 | Su et al. |
| 2016/0027187 A1 | 1/2016 | Wang et al. |
| 2016/0050369 A1 | 2/2016 | Takenaka et al. |
| 2016/0080753 A1 | 3/2016 | Oh |
| 2016/0112489 A1 | 4/2016 | Adams et al. |
| 2016/0112704 A1 | 4/2016 | Grange et al. |
| 2016/0142697 A1 | 5/2016 | Budagavi et al. |
| 2016/0150231 A1 | 5/2016 | Schulze |
| 2016/0165257 A1 | 6/2016 | Chen et al. |
| 2016/0227214 A1 | 8/2016 | Rapaka et al. |
| 2016/0234438 A1 | 8/2016 | Satoh |
| 2016/0241836 A1 | 8/2016 | Cole et al. |
| 2016/0269632 A1 | 9/2016 | Morioka |
| 2016/0277746 A1 | 9/2016 | Fu et al. |
| 2016/0286119 A1* | 9/2016 | Rondinelli .............. G03B 17/12 |
| 2016/0350585 A1 | 12/2016 | Lin et al. |
| 2016/0350592 A1 | 12/2016 | Ma et al. |
| 2016/0352791 A1 | 12/2016 | Adams et al. |
| 2016/0352971 A1 | 12/2016 | Adams et al. |
| 2016/0353089 A1* | 12/2016 | Gallup ................ G02B 27/0172 |
| 2016/0353146 A1* | 12/2016 | Weaver .............. H04N 21/2662 |
| 2016/0360104 A1 | 12/2016 | Zhang et al. |
| 2016/0360180 A1 | 12/2016 | Cole et al. |
| 2017/0013279 A1 | 1/2017 | Puri et al. |
| 2017/0026659 A1 | 1/2017 | Lin et al. |
| 2017/0038942 A1 | 2/2017 | Rosenfeld et al. |
| 2017/0054907 A1 | 2/2017 | Nishihara et al. |
| 2017/0064199 A1 | 3/2017 | Lee et al. |
| 2017/0078447 A1 | 3/2017 | Hancock et al. |
| 2017/0085892 A1 | 3/2017 | Liu et al. |
| 2017/0094184 A1* | 3/2017 | Gao ................... H04N 5/23296 |
| 2017/0104927 A1 | 4/2017 | Mugavero et al. |
| 2017/0109930 A1* | 4/2017 | Holzer ................... G06T 13/20 |
| 2017/0127008 A1* | 5/2017 | Kankaanpaa ...... G06K 9/00711 |
| 2017/0142371 A1 | 5/2017 | Barzuza et al. |
| 2017/0155912 A1 | 6/2017 | Thomas et al. |
| 2017/0180635 A1 | 6/2017 | Hayashi et al. |
| 2017/0200255 A1 | 7/2017 | Lin et al. |
| 2017/0200315 A1 | 7/2017 | Lockhart |
| 2017/0208346 A1 | 7/2017 | Narroschke et al. |
| 2017/0214937 A1 | 7/2017 | Lin et al. |
| 2017/0223268 A1 | 8/2017 | Shimmoto |
| 2017/0223368 A1 | 8/2017 | Abbas et al. |
| 2017/0228867 A1 | 8/2017 | Baruch |
| 2017/0230668 A1 | 8/2017 | Lin et al. |
| 2017/0236323 A1 | 8/2017 | Lim et al. |
| 2017/0244775 A1 | 8/2017 | Ha et al. |
| 2017/0251208 A1 | 8/2017 | Adsumilli et al. |
| 2017/0257644 A1 | 9/2017 | Andersson et al. |
| 2017/0272698 A1 | 9/2017 | Liu et al. |
| 2017/0272758 A1 | 9/2017 | Lin et al. |
| 2017/0278262 A1* | 9/2017 | Kawamoto .............. B64C 39/02 |
| 2017/0280126 A1 | 9/2017 | Van der Auwera et al. |
| 2017/0287200 A1 | 10/2017 | Forutanpour et al. |
| 2017/0287220 A1 | 10/2017 | Khalid et al. |
| 2017/0295356 A1 | 10/2017 | Abbas et al. |
| 2017/0301065 A1 | 10/2017 | Adsumilli et al. |
| 2017/0301132 A1 | 10/2017 | Dalton et al. |
| 2017/0302714 A1 | 10/2017 | Ramsay et al. |
| 2017/0302951 A1 | 10/2017 | Joshi et al. |
| 2017/0309143 A1 | 10/2017 | Trani et al. |
| 2017/0322635 A1 | 11/2017 | Yoon et al. |
| 2017/0323422 A1 | 11/2017 | Kim et al. |
| 2017/0323423 A1 | 11/2017 | Lin et al. |
| 2017/0332107 A1 | 11/2017 | Abbas et al. |
| 2017/0336705 A1* | 11/2017 | Zhou ...................... H04N 19/85 |
| 2017/0339324 A1 | 11/2017 | Tocher et al. |
| 2017/0339341 A1* | 11/2017 | Zhou ................. H04N 5/23238 |
| 2017/0339391 A1* | 11/2017 | Zhou .................... H04L 65/607 |
| 2017/0339392 A1 | 11/2017 | Forutanpour et al. |
| 2017/0339415 A1 | 11/2017 | Wang et al. |
| 2017/0344843 A1 | 11/2017 | Wang et al. |
| 2017/0353737 A1 | 12/2017 | Lin et al. |
| 2017/0359590 A1 | 12/2017 | Zhang et al. |
| 2017/0366808 A1 | 12/2017 | Lin et al. |
| 2017/0374332 A1 | 12/2017 | Yamaguchi et al. |
| 2017/0374375 A1 | 12/2017 | Makar et al. |
| 2018/0005447 A1 | 1/2018 | Wallner et al. |
| 2018/0005449 A1 | 1/2018 | Wallner et al. |
| 2018/0007387 A1 | 1/2018 | Izumi |
| 2018/0007389 A1 | 1/2018 | Izumi |
| 2018/0018807 A1 | 1/2018 | Lu et al. |
| 2018/0020202 A1 | 1/2018 | Xu et al. |
| 2018/0020238 A1 | 1/2018 | Liu et al. |
| 2018/0027178 A1 | 1/2018 | Macmillan et al. |
| 2018/0027226 A1 | 1/2018 | Abbas et al. |
| 2018/0027257 A1 | 1/2018 | Izumi et al. |
| 2018/0047208 A1 | 2/2018 | Marin et al. |
| 2018/0048890 A1 | 2/2018 | Kim et al. |
| 2018/0053280 A1 | 2/2018 | Kim et al. |
| 2018/0054613 A1 | 2/2018 | Lin et al. |
| 2018/0061002 A1 | 3/2018 | Lee et al. |
| 2018/0063505 A1 | 3/2018 | Lee et al. |
| 2018/0063544 A1 | 3/2018 | Tourapis et al. |
| 2018/0075576 A1 | 3/2018 | Liu et al. |
| 2018/0075604 A1 | 3/2018 | Kim et al. |
| 2018/0075635 A1 | 3/2018 | Choi et al. |
| 2018/0077451 A1 | 3/2018 | Yip et al. |
| 2018/0084257 A1 | 3/2018 | Abbas |
| 2018/0091812 A1 | 3/2018 | Guo et al. |
| 2018/0098090 A1 | 4/2018 | Lin et al. |
| 2018/0101931 A1 | 4/2018 | Abbas et al. |
| 2018/0109810 A1 | 4/2018 | Xu et al. |
| 2018/0124312 A1 | 5/2018 | Chang et al. |
| 2018/0130243 A1 | 5/2018 | Kim et al. |
| 2018/0130264 A1 | 5/2018 | Ebacher |
| 2018/0146136 A1 | 5/2018 | Yamamoto |
| 2018/0146138 A1 | 5/2018 | Jeon et al. |
| 2018/0152636 A1 | 5/2018 | Yim et al. |
| 2018/0152663 A1 | 5/2018 | Wozniak et al. |
| 2018/0160113 A1 | 6/2018 | Jeong et al. |
| 2018/0160138 A1 | 6/2018 | Park |
| 2018/0160156 A1 | 6/2018 | Hannuksela et al. |
| 2018/0164593 A1 | 6/2018 | Van der Auwera et al. |
| 2018/0167613 A1 | 6/2018 | Hannuksela et al. |
| 2018/0167634 A1 | 6/2018 | Salmimaa et al. |
| 2018/0174619 A1 | 6/2018 | Roy et al. |
| 2018/0176468 A1 | 6/2018 | Wang et al. |
| 2018/0176536 A1 | 6/2018 | Jo et al. |
| 2018/0176596 A1 | 6/2018 | Jeong et al. |
| 2018/0176603 A1 | 6/2018 | Fujimoto |
| 2018/0184101 A1 | 6/2018 | Ho |
| 2018/0184121 A1 | 6/2018 | Kim et al. |
| 2018/0191787 A1 | 7/2018 | Morita et al. |
| 2018/0192074 A1 | 7/2018 | Shih et al. |
| 2018/0199029 A1 | 7/2018 | Van der Auwera et al. |
| 2018/0199034 A1 | 7/2018 | Nam et al. |
| 2018/0199070 A1 | 7/2018 | Wang |
| 2018/0218512 A1 | 8/2018 | Chan et al. |
| 2018/0220138 A1 | 8/2018 | He et al. |
| 2018/0227484 A1 | 8/2018 | Hung et al. |
| 2018/0234700 A1 | 8/2018 | Kim et al. |
| 2018/0240223 A1 | 8/2018 | Yi et al. |
| 2018/0240276 A1 | 8/2018 | He et al. |
| 2018/0242016 A1 | 8/2018 | Lee et al. |
| 2018/0242017 A1 | 8/2018 | Van Leuven et al. |
| 2018/0249076 A1 | 8/2018 | Sheng et al. |
| 2018/0249163 A1 | 8/2018 | Curcio et al. |
| 2018/0249164 A1 | 8/2018 | Kim et al. |
| 2018/0253879 A1 | 9/2018 | Li et al. |
| 2018/0262775 A1 | 9/2018 | Lee et al. |
| 2018/0268517 A1 | 9/2018 | Coban et al. |
| 2018/0270417 A1 | 9/2018 | Suitoh et al. |
| 2018/0276788 A1 | 9/2018 | Lee et al. |
| 2018/0276789 A1 | 9/2018 | Van der Auwera et al. |
| 2018/0276826 A1 | 9/2018 | Van der Auwera et al. |
| 2018/0276890 A1 | 9/2018 | Wang |
| 2018/0286109 A1 | 10/2018 | Woo et al. |
| 2018/0288435 A1 | 10/2018 | Boyce et al. |
| 2018/0295282 A1 | 10/2018 | Boyce et al. |
| 2018/0302621 A1 | 10/2018 | Fu et al. |

(56) References Cited

U.S. PATENT DOCUMENTS

| | | |
|---|---|---|
| 2018/0307398 A1 | 10/2018 | Kim et al. |
| 2018/0315245 A1 | 11/2018 | Patel |
| 2018/0322611 A1 | 11/2018 | Bang et al. |
| 2018/0329482 A1 | 11/2018 | Woo et al. |
| 2018/0332265 A1 | 11/2018 | Hwang et al. |
| 2018/0332279 A1 | 11/2018 | Kang et al. |
| 2018/0338142 A1 | 11/2018 | Kim et al. |
| 2018/0343388 A1 | 11/2018 | Matsushita |
| 2018/0349705 A1 | 12/2018 | Kim et al. |
| 2018/0350407 A1 | 12/2018 | Decoodt et al. |
| 2018/0352225 A1 | 12/2018 | Guo et al. |
| 2018/0352259 A1 | 12/2018 | Guo et al. |
| 2018/0352264 A1 | 12/2018 | Guo et al. |
| 2018/0359487 A1 | 12/2018 | Bang et al. |
| 2018/0374192 A1 | 12/2018 | Kunkel et al. |
| 2018/0376126 A1 | 12/2018 | Hannuksela |
| 2018/0376152 A1 | 12/2018 | Wang et al. |
| 2019/0004414 A1 | 1/2019 | Kim et al. |
| 2019/0007669 A1 | 1/2019 | Kim et al. |
| 2019/0007679 A1 | 1/2019 | Coban et al. |
| 2019/0007684 A1 | 1/2019 | Van der Auwera et al. |
| 2019/0012766 A1 | 1/2019 | Yoshimi |
| 2019/0014304 A1 | 1/2019 | Curcio et al. |
| 2019/0026858 A1 | 1/2019 | Lin et al. |
| 2019/0026934 A1 | 1/2019 | Shih et al. |
| 2019/0026956 A1 | 1/2019 | Gausebeck et al. |
| 2019/0028642 A1 | 1/2019 | Fujita et al. |
| 2019/0045212 A1 | 2/2019 | Rose et al. |
| 2019/0057487 A1 | 2/2019 | Cheng |
| 2019/0057496 A1 | 2/2019 | Ogawa et al. |
| 2019/0082184 A1 | 3/2019 | Hannuksela |
| 2019/0104315 A1 | 4/2019 | Guo et al. |
| 2019/0108611 A1 | 4/2019 | Izumi |
| 2019/0132521 A1 | 5/2019 | Fujita et al. |
| 2019/0132594 A1 | 5/2019 | Chung et al. |
| 2019/0141318 A1 | 5/2019 | Li et al. |
| 2019/0158800 A1 | 5/2019 | Kokare et al. |
| 2019/0191170 A1 | 6/2019 | Zhao et al. |
| 2019/0200016 A1 | 6/2019 | Jang et al. |
| 2019/0200023 A1 | 6/2019 | Hanhart et al. |
| 2019/0215512 A1 | 7/2019 | Lee et al. |
| 2019/0215532 A1 * | 7/2019 | He ................ H04N 19/172 |
| 2019/0230285 A1 | 7/2019 | Kim |
| 2019/0230337 A1 | 7/2019 | Kim |
| 2019/0230368 A1 | 7/2019 | Zhao et al. |
| 2019/0230377 A1 | 7/2019 | Ma et al. |
| 2019/0236990 A1 | 8/2019 | Song et al. |
| 2019/0238888 A1 | 8/2019 | Kim |
| 2019/0246141 A1 | 8/2019 | Kim et al. |
| 2019/0253622 A1 | 8/2019 | Van der Auwera et al. |
| 2019/0253624 A1 | 8/2019 | Kim |
| 2019/0253703 A1 | 8/2019 | Coban et al. |
| 2019/0260990 A1 | 8/2019 | Lim et al. |
| 2019/0268594 A1 | 8/2019 | Lim et al. |
| 2019/0272616 A1 | 9/2019 | Lee et al. |
| 2019/0273929 A1 | 9/2019 | Ma et al. |
| 2019/0273949 A1 | 9/2019 | Kim et al. |
| 2019/0281217 A1 | 9/2019 | Kim |
| 2019/0281273 A1 | 9/2019 | Lin et al. |
| 2019/0281290 A1 | 9/2019 | Lee et al. |
| 2019/0289324 A1 | 9/2019 | Budagavi |
| 2019/0289331 A1 | 9/2019 | Byun |
| 2019/0297341 A1 | 9/2019 | Zhou |
| 2019/0297350 A1 | 9/2019 | Lin et al. |
| 2019/0306515 A1 | 10/2019 | Shima |
| 2019/0355126 A1 | 11/2019 | Sun et al. |
| 2019/0379893 A1 | 12/2019 | Krishnan |
| 2019/0387251 A1 | 12/2019 | Lin et al. |
| 2020/0029077 A1 | 1/2020 | Lee et al. |
| 2020/0036976 A1 | 1/2020 | Kanoh et al. |
| 2020/0045323 A1 | 2/2020 | Hannuksela |
| 2020/0058165 A1 | 2/2020 | Choi et al. |
| 2020/0074587 A1 | 3/2020 | Lee et al. |
| 2020/0074687 A1 | 3/2020 | Lin et al. |
| 2020/0077092 A1 | 3/2020 | Lin et al. |
| 2020/0084441 A1 | 3/2020 | Lee et al. |
| 2020/0120340 A1 | 4/2020 | Park et al. |
| 2020/0120359 A1 | 4/2020 | Hanhart et al. |
| 2020/0137401 A1 | 4/2020 | Kim et al. |
| 2020/0137418 A1 | 4/2020 | Onno et al. |
| 2020/0153885 A1 | 5/2020 | Lee et al. |
| 2020/0162731 A1 | 5/2020 | Kim et al. |
| 2020/0213570 A1 | 7/2020 | Shih et al. |
| 2020/0213571 A1 | 7/2020 | Kim et al. |
| 2020/0213587 A1 | 7/2020 | Galpin et al. |
| 2020/0234399 A1 | 7/2020 | Lin et al. |
| 2020/0244957 A1 | 7/2020 | Sasai et al. |
| 2020/0252650 A1 | 8/2020 | Shih et al. |
| 2020/0260082 A1 | 8/2020 | Lim et al. |
| 2020/0260120 A1 | 8/2020 | Hanhart et al. |
| 2020/0267385 A1 | 8/2020 | Lim et al. |
| 2020/0396461 A1 | 12/2020 | Zhao et al. |
| 2021/0006714 A1 | 1/2021 | Kim |
| 2021/0006838 A1 | 1/2021 | Lee et al. |

FOREIGN PATENT DOCUMENTS

| | | |
|---|---|---|
| JP | 2012-160886 A | 8/2012 |
| JP | 2014-176034 A | 9/2014 |
| KR | 2017-0015938 A | 2/2017 |
| WO | WO 2012/044709 A1 | 4/2012 |
| WO | WO 2015/138979 A2 | 9/2015 |
| WO | WO 2015/184416 A1 | 12/2015 |
| WO | WO 2016/076680 A1 | 5/2016 |
| WO | WO 2016/140060 A1 | 9/2016 |
| WO | WO 2017/125030 A1 | 7/2017 |
| WO | WO-2017127816 A1 * | 7/2017 ............. H04N 5/247 |
| WO | WO 2018/118159 A1 | 6/2018 |

OTHER PUBLICATIONS

Kammachi et al.; "AHG8: Test results for viewport-dependent pyramid, cube map, and equirectangular panorama schemes"; JVET-D00078; Oct. 2016; 7 pages.

Yip et al.; "Technologies under Considerations for ISO/IEC 23000-20 Omnidirectional Media Application Format"; ISO/IEC JTC1/SC29/WG11 MPEG2017/W16637; Jan. 2017; 50 pages.

International Patent Application No. PCT/US2018/018246; Int'l Search Report and the Written Opinion; dated Apr. 20, 2018; 15 pages.

Tosic et al.; "Multiresolution Motion Estimation for Omnidirectional Images"; IEEE 13$^{th}$ European Signal Processing Conference; Sep. 2005; 4 pages.

He et al.; "AHG8: Geometry padding for 360 video coding"; Joint Video Exploration Team (JVET); Document: JVET-D0075; Oct. 2016; 10 pages.

Vishwanath et al.; "Rotational Motion Model for Temporal Prediction in 360 Video Coding"; IEEE 19$^{th}$ Int'l Workshop on Multimedia Signal Processing; Oct. 2017; 6 pages.

Sauer et al.; "Improved Motion Compensation for 360 Video Projected to Polytopes" Proceedings of the IEEE Int'l Conf. on Multimedia and Expo; Jul. 2017; p. 61-66.

International Patent Application No. PCT/US2018/017124; Int'l Search Report and the Written Opinion; dated Apr. 30, 2018; 19 pages.

Boyce et al.; "Common Test Conditions and Evaluation Procedures for 360 degree Video Coding"; Joint Video Exploration Team; ITU-T SG 16 WP 3 and ISO/IEC JTC 1/SC 29/WG 11; Doc. JVET-D1030; Oct. 2016; 6 pages.

Li et al.; "Projection Based Advanced Motion Model for Cubic Mapping for 360-Degree Video"; Cornell University Library; 2017; 5 pages.

Zheng et al.; "Adaptive Selection of Motion Models for Panoramic Video Coding"; IEEE Int'l Conf. Multimedia and Expo; Jul. 2007; p. 1319-1322.

He et al.; "AHG8: Algorithm description of InterDigital's projection format conversion tool (PCT360)"; Joint Video Exploration Team; ITU-T SG 16 WP 3 and ISO/IEC JTC 1/SC 29/WG 11; Doc. JVET-D0090; Oct. 2016; 6 pages.

(56) References Cited

OTHER PUBLICATIONS

International Patent Application No. PCT/US2017/051542; Int'l Search Report and the Written Opinion; dated Dec. 7, 2017; 17 pages.
International Patent Application No. PCT/US2017/051542; Int'l Preliminary Report on Patentability; dated Jul. 4, 2019; 10 pages.
Choi et al.; "Text of ISO/IEC 23000-20 CD Omnidirectional Media Application Format"; Coding of Moving Pictures and Audio; ISO/IEC JTC1/SC29/WG11 N16636; Jan. 2017; 48 pages.
International Patent Application No. PCT/US2018/018246; Int'l Preliminary Report on Patentability; dated Sep. 6, 2019; 8 pages.
International Patent Application No. PCT/US2018/017124; Int'l Preliminary Report on Patentability; dated Aug. 29, 2019; 12 pages.
Sauer et al.; "Geometry correction for motion compensation of planar-projected 360VR video"; Joint Video Exploration Team; Document: JVET-D0067; Oct. 2016; 13 pages.

* cited by examiner

100

300

400

500

600

700

800

900

1000

1100

OBJECT TRACKING IN MULTI-VIEW VIDEO

BACKGROUND

The present disclosure relates to display of image content from multi-view video data.

Some modern imaging applications capture image data from multiple directions about a reference point. Some cameras pivot during image capture, which allows a camera to capture image data across an angular sweep that expands the camera's effective field of view. Some other cameras have multiple imaging systems that capture image data in several different fields of view. In either case, an aggregate image may be created that represents a merger or "stitching" of image data captured from these multiple views.

Oftentimes, the multi-view video is not displayed in its entirety. Instead, users often control display operation to select a desired portion of the multi-view image that is to be rendered. For example, when rendering an image that represents a 360° view about a reference point, a user might enter commands that cause rendering to appear as if it rotates throughout the 360° space, from which the user perceives that he is exploring the 360° image space.

While such controls provide intuitive ways for an operator to view a static image, it can be cumbersome when an operator views multi-view video data, where content elements can move, often in inconsistent directions. An operator is forced to enter controls continuously to watch an element of the video that draws his interest, which can become frustrating when the operator would prefer simply to observe desired content.

Accordingly, the inventors perceive a need in the art for rendering controls for multi-view video that do not require operator interaction.

DETAILED DESCRIPTION

Embodiments of the present disclosure provide techniques for managing display of content from multi-view video data. According to these techniques, an object may be identified from content of the multi-view video. The object's location may be tracked across a sequence of multi-view video. The technique may extract a sub-set of video that is contained within a view window that is shifted in an image space of the multi-view video in correspondence to the tracked object's location. The extracted video may be transmitted to a display device.

Figure 1:
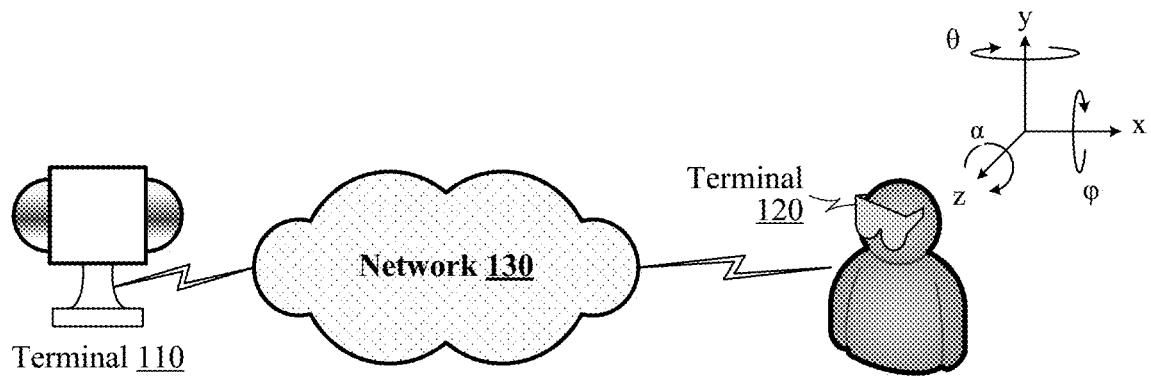
FIG. 1 illustrates a system suitable for use with embodiments of the present disclosure.

FIG. 1 illustrates a system 100 in which embodiments of the present disclosure may be employed. The system 100 may include at least two terminals 110-120 interconnected via a network 130. The first terminal 110 may have an image source that generates multi-directional and/or omnidirectional video (multi-view video, for convenience). The terminal 110 also may include coding systems and transmission systems (not shown) to transmit coded representations of the multi-view video to the second terminal 120, where it may be consumed. For example, the second terminal 120 may display the multi-view video on a head mounted display, it may execute a video editing program to modify the multi-view video, or may integrate the multi-view video into an application executing on the terminal 120, or it may store the multi-view video for later use.

The receiving terminal 120 may display video content representing a selected portion of the multi-view video, called a "view window," captured by the first terminal 110. The terminal 120 may contain one or more input devices (not shown) in FIG. 1 that identifies a portion of the multi-view video that interests a user of the receiving terminal 120 and selects the identified portion as the view window for display. For example, a head mounted display may include a motion sensor that determines orientation of the head mounted display as an operator uses the display. The head mounted display may provide an illusion the operator that he is look about a image space and, as the operator moves his head to looking about this space, the view window may shift in accordance with the operator's movement.

In FIG. 1, the second terminal 120 is illustrated as a head mounted display but the principles of the present disclosure are not so limited. Embodiments of the present disclosure find application with flat panel displays commonly found in laptop computers, tablet computers, smart phones, servers, media players, television displays, hologram displays, and/or dedicated video conferencing equipment. The network 130 represents any number of networks that convey coded video data among the terminals 110-120, including, for example, wireline and/or wireless communication networks. The communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless explained hereinbelow.

FIG. 1 illustrates components that are appropriate for unidirectional transmission of multi-view video, from the first terminal 110 to the second terminal 120. In some applications, it may be appropriate to provide for bidirectional exchange of video data, in which case the second terminal 120 may include its own image source, video coder and transmitters (not shown), and the first terminal 110 may include its own receiver and display (also not shown). If it is desired to exchange multi-view video bidirectionally, then the techniques discussed hereinbelow may be replicated to generate a pair of independent unidirectional exchanges of multi-view video. In other applications, it would be permissible to transmit multi-view video in one direction (e.g., from the first terminal 110 to the second terminal 120) and transmit "flat" video (e.g., video from a limited field of view) in a reverse direction.

Figure 2:
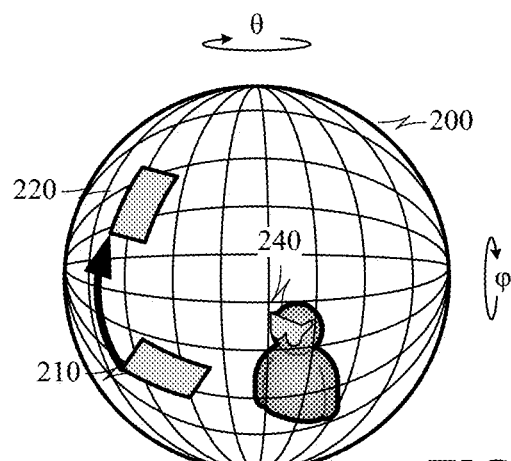
FIG. 2 illustrates an image space suitable for use with embodiments of the present disclosure.

FIG. 2 illustrates an exemplary image space 200 suitable for use with embodiments of the present disclosure. There, a multi-view image is depicted as a spherical image space 200 on which image content of the multi-view image is projected. Alternatively, an equirectangular image space (not shown) may be used. In the illustrated example, individual pixel locations of a multi-view image may be indexed by angular coordinates (θ,φ) defined with respect to a predetermined origin. View windows 210, 220 may be extracted from the image space 200, which may cause image content to be displayed on a receiving terminal 240.

According to an embodiment, receiving terminals 240 may operate according to display modes that do not require operator interaction with the terminals 240 to shift view windows. For example, embodiments of the present disclosure may track image content within the spherical image space 200 that are designated as objects of interest and may shift view windows according to the tracked objects. In this manner, as objects travel within the image space 200 the operators may have the objects displayed at their receiving device 240 without having to interact directly with the display, for example, moving his head to track the object manually.

Figure 3:
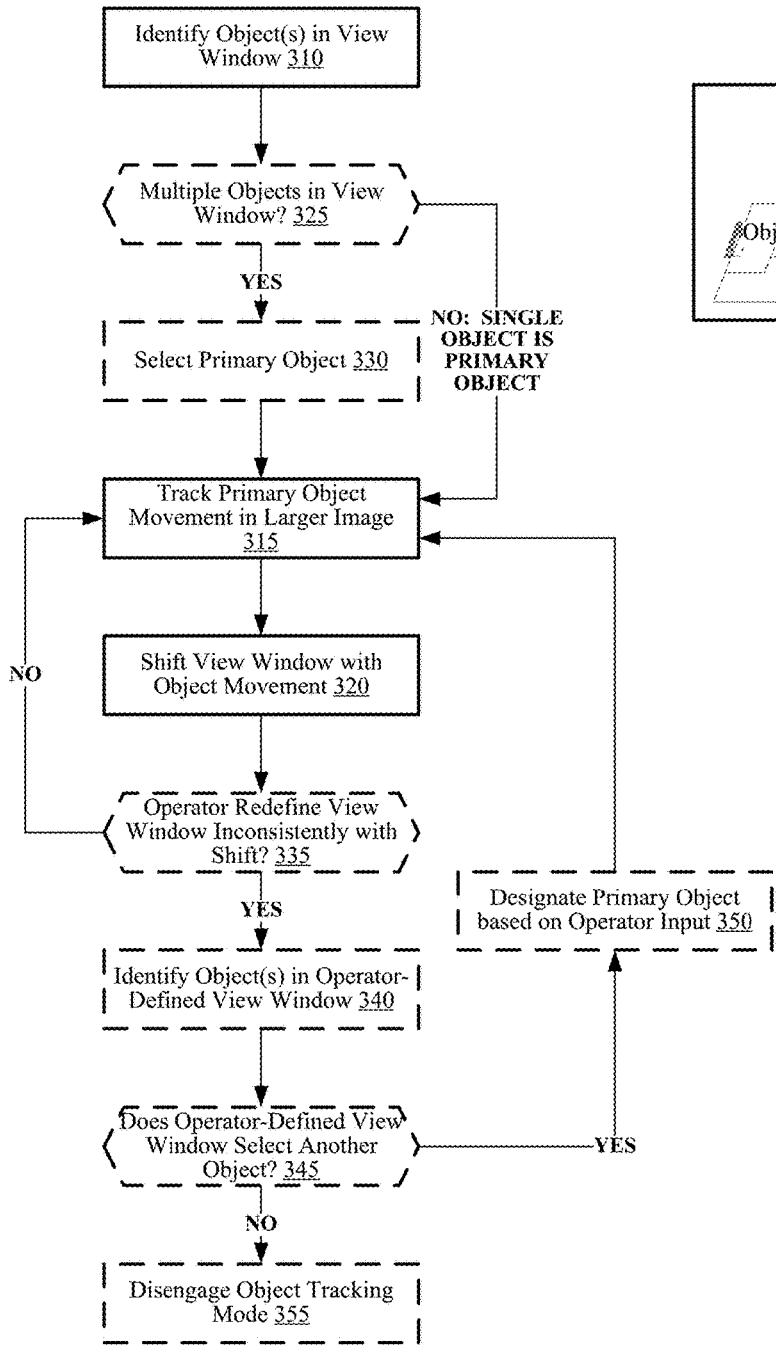
FIG. 3 illustrates a method according to an embodiment of the present disclosure.

FIG. 3 illustrates a method 300 according to an embodiment of the present disclosure. The method 300 may be performed when operating in a content tracking mode. The method 300 may identify an object in a view window of a device that displays video content (box 310). As discussed, the view window may be a portion of a larger image that is being rendered on the display device. The method may track movement of the object within the larger image (box 315) and may shift the view window in accordance with the object movement (box 320). The operations of boxes 315 and 320 may repeat for as long as the content tracking mode is engaged. In this mode, displayed images will include content of the identified object as the object moves away from the original view window without requiring user input.

It is possible that identification of objects (box 310) will result in identification of multiple objects. In such an embodiment, when the method 300 determines that multiple objects are present in a view window (box 325), it may select one of the objects to serve as a primary object (box 330). Object tracking (box 315) and window shifting (box 320) may be performed using the primary object as the basis of such operations.

In such an embodiment, the method 300 may determine whether operator input is received that is inconsistent with the window shifting operations of box 320 (box 335). If so, the method 300 may identify object(s) in a view window defined by the operator input (box 340) and determine whether an object in the operator-defined view window is contained in the view window from which objects were identified in box 310 (box 345). If so, the method 300 may designate the object that appears in the operator-defined view window as the primary object (box 350) and resume operations of tracking the primary object and shifting the view window based on movement of the primary object (boxes 315, 320). If the operator-defined view window does not contain an object that also is contained in the view window from which objects were identified in box 310, then the method 300 may take alternative action. In the embodiment illustrated in FIG. 3, the method 300 may disengage the tracking mode (box 355). In another embodiment, the method 300 may advance to box 330 and select one of the objects in the operator-defined view window as a primary object.

Figure 4:
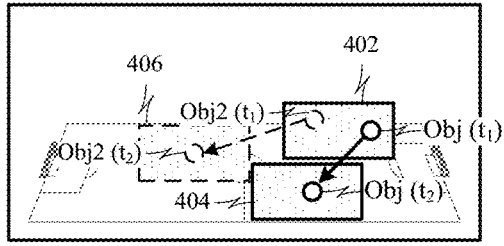
FIG. 4 illustrates exemplary image content on which the method for FIG. 3 may be performed.

FIG. 4 illustrates exemplary image content 400 on which the method 300 may be performed. FIG. 4 illustrates the image content 400 in a two-dimensional representation for ease of discussion but the principles of the present discussion apply to image content in the spherical projections discussed earlier. In FIG. 4, the content tracking mode may be applied at a time t1 when a view window 402 is defined for the larger images. When object identification is performed on view window 402, an object Obj1 may be identified in the view window 402. Thereafter, the method 300 may track movement of the object Obj1 through other images and the method 300 may shift the view window in accordance with the tracked image. Thus, in the example of FIG. 4, the object Obj1 may have moved to a different location by time t2, which causes the method 300 to shift the view window to a position 404. Thus, the method 300 may cause a view window 402 to be output for an image at time t1 and a view window 404 to be output for an image at time t2.

FIG. 4 also illustrates a use case in which a plurality of objects Obj1, Obj2 are identified in an original view window 402. During operation of boxes 325 and 330, one of the objects (say, Obj1) may be selected as the primary object, and object tracking and window shifting may occur with reference to Obj1. If operator input is received that is inconsistent with the shifting window, then the method 300 may search for new objects that is consistent with the operator input. For example, the operator may have provided input that defines a view window 406. In this instance, the method 300 may identify objects in the new view window 406. Object Obj2 may be identified in this circumstance, which would cause the method 300 to identify Obj2 as the primary object.

Operator input at box 335 may be received in a variety of ways. In an application involving head mounted displays, operator input may be derived from orientation data provided by the headset. For example, if a primary object causes a view window to shift in one direction but the operator is watching another object as his object of interest, the operator may move his head in an instinctive effort to track the object of interest. In this event, such motion may be captured by the headset and used by the method 300 to designate a new primary object.

Operator input may be received in other ways. Operator input may be received by direct operator input that indicate commands to a device to shift content, such as mouse or trackpad data, remote control data, or gestures captured by imaging equipment.

And, of course, a device may provide user interface tools through which an operator may annotate displayed content and identify the primary object directly. Such identifications also may be used by the method 300 at boxes 340 and/or 310.

Figure 5:
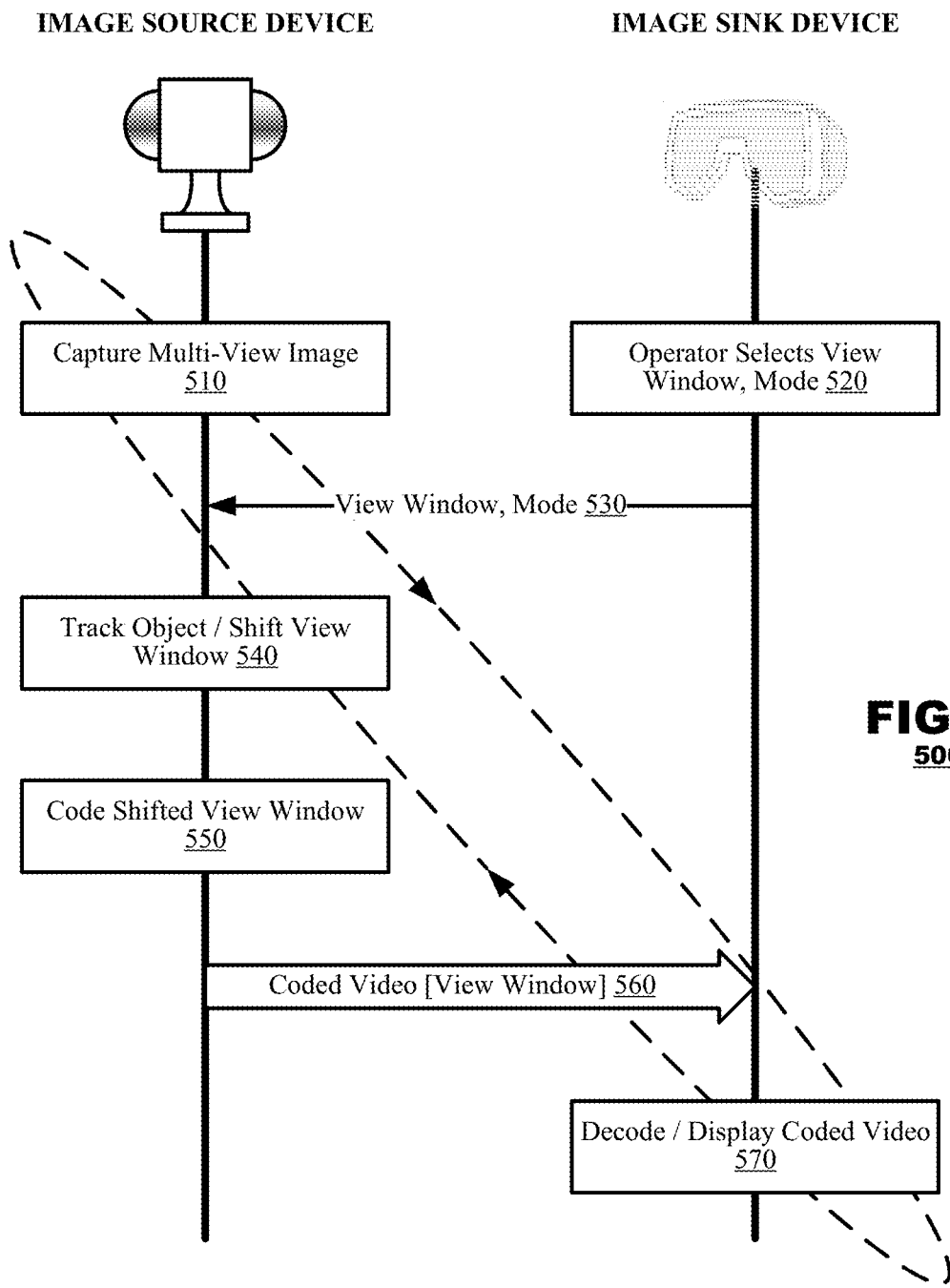
FIG. 5 is a communication flow diagram according to an embodiment of the present disclosure.
Figure 6:
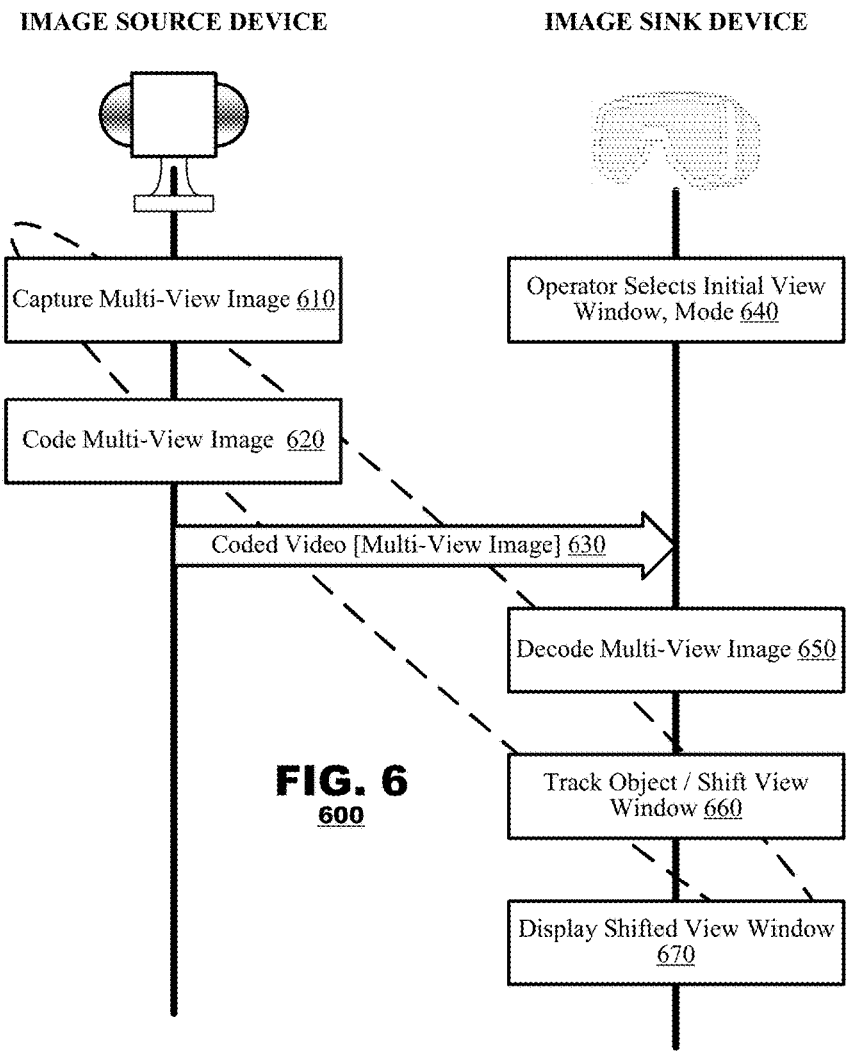
FIG. 6 is a communication flow diagram according to another embodiment of the present disclosure.

The operations to track primary objects and shift view windows may be performed either at an image source device or an image sink device. FIG. 5 is a communication flow diagram according to an embodiment of the present disclosure in which the tracking and shifting operations are performed at an image source device. FIG. 6 is a communication flow diagram according to an embodiment of the present disclosure in which the tracking and shifting operations are performed at an image sink device.

FIG. 5 is a communication flow diagram according to an embodiment of the present disclosure. In this embodiment, an image source device may capture multi-view video (box 510). At an image sink device, an operator may select an initial view window and engage the tracking mode of operation (box 530). The image sink device may communicate parameters of the initial view window to the image source device (msg. 530). Responsive to the initial view window, the image source device may perform object tracking and shifting of view windows (box 540). The image source device may code the shifted view window (box 550) and may transmit coded video of the view window to the image sink device (msg. 560). The image sink device may decode and display the coded video 570. The operations of FIG. 5 may repeat for as long as the tracking mode is engaged. If/when an operator redefines a view window, it may cause a new iteration of box 520 and msg 530 to be performed.

In an embodiment, an initial view window may be identified by operator input. When performed by a head mounted display, information such as pitch, yaw, roll, and/or free space location (x/y/z coordinates) can be signaled to the image source device. In another embodiment, operator input may be entered by hand operated control, for example joystick, keyboard or touch screen input.

FIG. 6 is a communication flow diagram according to another embodiment of the present disclosure. In this embodiment, an image source device may capture multi-view video (box 610), code the multi-view video in its entirety (box 620) and transmit coded video data of the multi-view image to the image sink device (box 630).

The image sink device may receive an operator selection of an initial view window (box 640) and may engage the tracking mode. The image sink device may decode the coded video (box 650) from which the multi-view video is recovered. The image sink device may perform object tracking and window shifting based on object movement (box 660) and the image sink device may display content of the shifted view window (box 670). The operations of FIG. 6 may repeat for as long as the tracking mode is engaged.

The communication flows of FIG. 5 and FIG. 6 each have their respective advantages. The communication flow of FIG. 5 tends to conserve bandwidth because an image source device need only code the image content that is contained in the view window that is being used at the image sink device. Unused portions of the multi-view video, those portions that will not be rendered at the image sink device, need not be coded and need not consume bandwidth in the communication channels that carry coded data.

The communication flow of FIG. 6, however, likely provides faster response to operator input. If, for example, it is determined that a new primary object should be used for tracking and view window control, the image sink device may have all image content of a multi-view video available to it, which allows the device to display a new shifted view window quickly based on processing at the local device. The image sink device need not report the operator input to the image source device, which incurs a first amount of communication delay over the communication channel(s) that extend between them, then wait to receive coded video of a new shift window, which incurs a second amount of communication delay. Moreover, the communication flow readily finds application in a multi-casting application where image data from the image source device is transmitted to multiple image sink devices (not shown) in parallel; each image sink device may extract its own view window based on local operator input rather than requiring an image source device to extract and code individually-defined view windows for all the image sink devices.

The embodiment of FIG. 6 also finds application in offline playback applications, where coded video is played by an image sink device from local storage (not shown). In this application, image capture and coding may be performed at a time separate from the video coding and display. For example, coded video data may be downloaded to an image sink device and stored locally for later playback. In fact, the coded video may be played from local storage multiple times. In this embodiment, viewers may identify an object of interest (e.g., by pressing a button in controller or other user control). The image sink device, may analyze a second being displayed to identify an object, track it and shift a view window (box 660) based on the identified object. Thus, the view window can be changed automatically to provide best matching view port to viewers.

In an embodiment, object tracking and window shifting (boxes 540, 660) may adjust level of tracking to mitigate viewer discomfort during shifts. In one embodiment, window shifts may be performed to keep a tracked object in a predetermined location of the view window. Consider, for example, a use case involving a sporting event, where a player is identified as an object of interest. In such a use case, the tracked player may be placed in a predetermined area of the shifted window, which causes background elements to appear as if they shift behind the player as the player moves in the multi-view image space. Such an embodiment may lead to improvement in the perceived quality of resultant video because the object of interest is maintained consistently in a selected area of the content displayed to a viewer.

In another embodiment, object tracking and window shifting (boxes 540, 660) may adjust level of tracking based on movement of the tracked object in the multi-view image space. Continuing with the example of the sporting event, where a ball is identified as an object of interest. In this use case, the tracked ball may move erratically within the multi-view image space, which may cause discomfort to a viewer. In such an application, the methods 300, 500 and/or 600 may consider magnitudes of motion of the tracked object within the multi-view image space (for example, by comparing it to a predetermined threshold) and may include a zoom effect in the shift the view window. Zooming the view window back, which effectively causes the view window to display a larger portion of the multi-view image space, may cause the tracked object to be perceived as having less motion than without the zoom effect, which can lead to improved perceptual quality of the resultant video. And, if motion is reduced below the threshold, the zoom effect may be removed to show a shifted view window at a level of zoom that matches a level of zoom that was in effect when the operator identified the object of interest.

In a further embodiment, view window(s) may be oriented to match orientation of a display at a viewer location. In this embodiment, the methods 300, 500 and/or 600 may align an orientation of a view window in the multi-view image space with an orientation of the display. For example, in one use case, the methods 300, 500 and/or 600 may align orientation of the view window with pitch, yaw, and/or roll factors output by a head mounted display. In such an embodiment, the methods 300, 500 and/or 600 may shift the view window to place a tracked object at a predetermined location within the window and may select an orientation of the view window to align with the pitch, yaw, and/or roll factors from the head mounted display.

In another embodiment, the methods 300, 500 and/or 600 may determine an orientation of a display and may align orientation of the view window to the orientation of the display. For example, a display device may possess a sensor such an accelerometer from which the device's orientation with respect to gravity may be determined. Alternatively, the display device may include a setting that defines a display mode (e.g., portrait mode or landscape mode) of the device. In such use cases, the methods 300, 500 and/or 600 may align the view window to the device's orientation. For example, the methods 300, 500 and/or 600 may estimate a horizontal display direction with respect to gravity based on the device's orientation and may estimate a horizontal display direction in the multi-view video content. In such an embodiment, the methods 300, 500 and/or 600 may shift the view window to place a tracked object at a predetermined location within the window and may select an orientation of the view window to align horizontal components within the view window to a horizontal direction of the display.

In a further embodiment, the methods 300, 500 and/or 600 may buffer decoded video of a predetermined temporal duration (say, 1 or 2 seconds) on a sliding window basis and may perform image tracking across the buffered frames. The image tracking algorithm may develop a view window shift transition progression that balances zoom depth and transition. In this manner, the algorithm may perform gradual controls that include both zoom control and shift control. In this manner, buffering of video is expected to reduce the possibility of discomfort and/or dizziness among viewers.

In another embodiment, image data may contain metadata that identifies an object of interest selected by an author or by a producer of the video. The methods 300, 500 and/or 600 may perform object tracking and view window shifting using an author's identification of an object of interest, rather than a viewer's identification of the object of interest. In a further embodiment, the author's identification of the object of interest may be overridden by viewer identification of an object of interest.

In a further embodiment, displayed image data of a tracked object may be subject to image enhancement (e.g., highlighting, brightness enhancement, halo effects and the like) or displayed image data of non-tracked content may be subject to image degradation (e.g., blurring of background content) to identify the object being tracked. And, when operator controls indicate that an operator is redesignating an object to be tracked, image enhancement effects may be applied to all candidate objects that are recognized by the methods 300, 500 and/or 600 to facilitate selection by the operator.

In an embodiment where multi-view video is stored for processing by the methods 300, 500 and/or 600, the video may have metadata stored in association with it that identifies object(s) in the video that can be tracked and their spatial and temporal position(s) within the video. In this manner, during coding, decoding and playback, it is unnecessary to perform object detection and tracking. The methods 300, 500 and/or 600 may select objects whose positions coincide with the positions identified by operator input.

Figure 7:
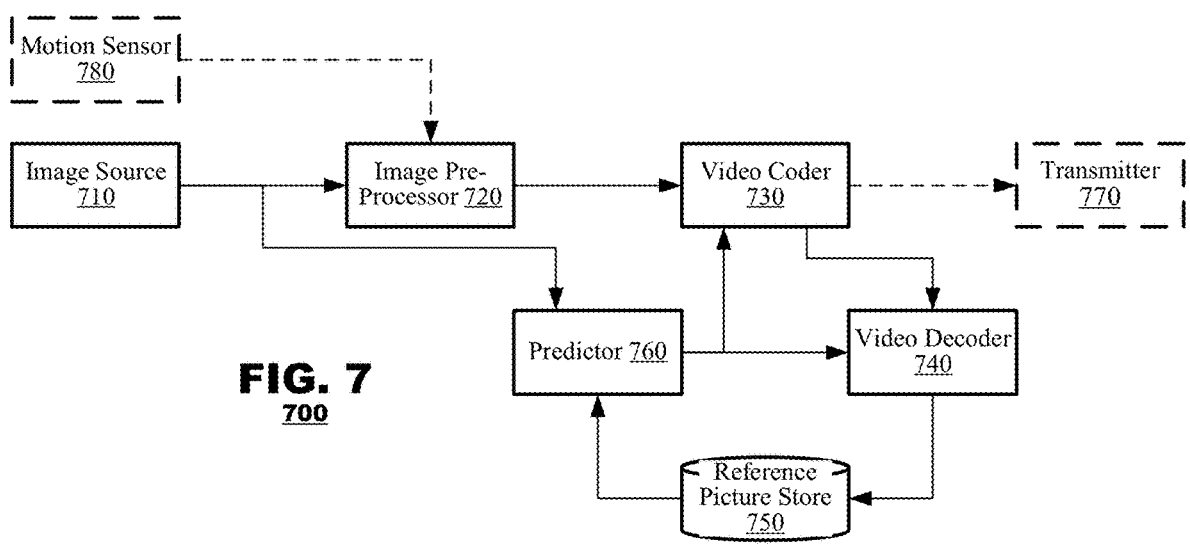
FIG. 7 is a functional block diagram of an image source device according to an embodiment of the present disclosure.

FIG. 7 is a functional block diagram of an image source device 700 according to an embodiment of the present disclosure. The device 700 may include an image source 710, an image processing system 720, a video coder 730, a video decoder 740, a reference picture store 750, a predictor 760, a transmitter 770 and, optionally, a motion sensor 780.

The image source 710 may generate image data as a multi-view image, containing image data of a field of view that extends around a reference point in multiple directions. The image processing system 720 may process the multi-view image data to condition it for coding by the video coder 730. The video coder 730 may generate a coded representation of its input image data, typically by exploiting spatial and/or temporal redundancies in the image data. The video coder 730 may output a coded representation of the input data that consumes less bandwidth than the original source video when transmitted and/or stored.

The video decoder 740 may invert coding operations performed by the video encoder 730 to obtain a reconstructed picture from the coded video data. Typically, the coding processes applied by the video coder 730 are lossy processes, which cause the reconstructed picture to possess various errors when compared to the original picture. The video decoder 740 may reconstruct picture of select coded pictures, which are designated as "reference pictures," and store the decoded reference pictures in the reference picture store 750. In the absence of transmission errors, the decoded reference pictures will replicate decoded reference pictures obtained by a decoder (not shown in FIG. 7).

The predictor 760 may select prediction references for new input pictures as they are coded. For each portion of the input picture being coded (called a "pixel block" for convenience), the predictor 760 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

When an appropriate prediction reference is identified, the predictor 760 may furnish the prediction data to the video coder 730. The video coder 730 may code input video data differentially with respect to prediction data furnished by the predictor 760. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 730 should consume less bandwidth than the input data when transmitted and/or stored. The image source device 700 may output the coded video data to an output device 770, such as a transmitter, that may transmit the coded video data across a communication network 130 (FIG. 1). Alternatively, the image source device 700 may output coded data to a storage device (not shown) such as an electronic-, magnetic- and/or optical storage medium.

Figure 8:
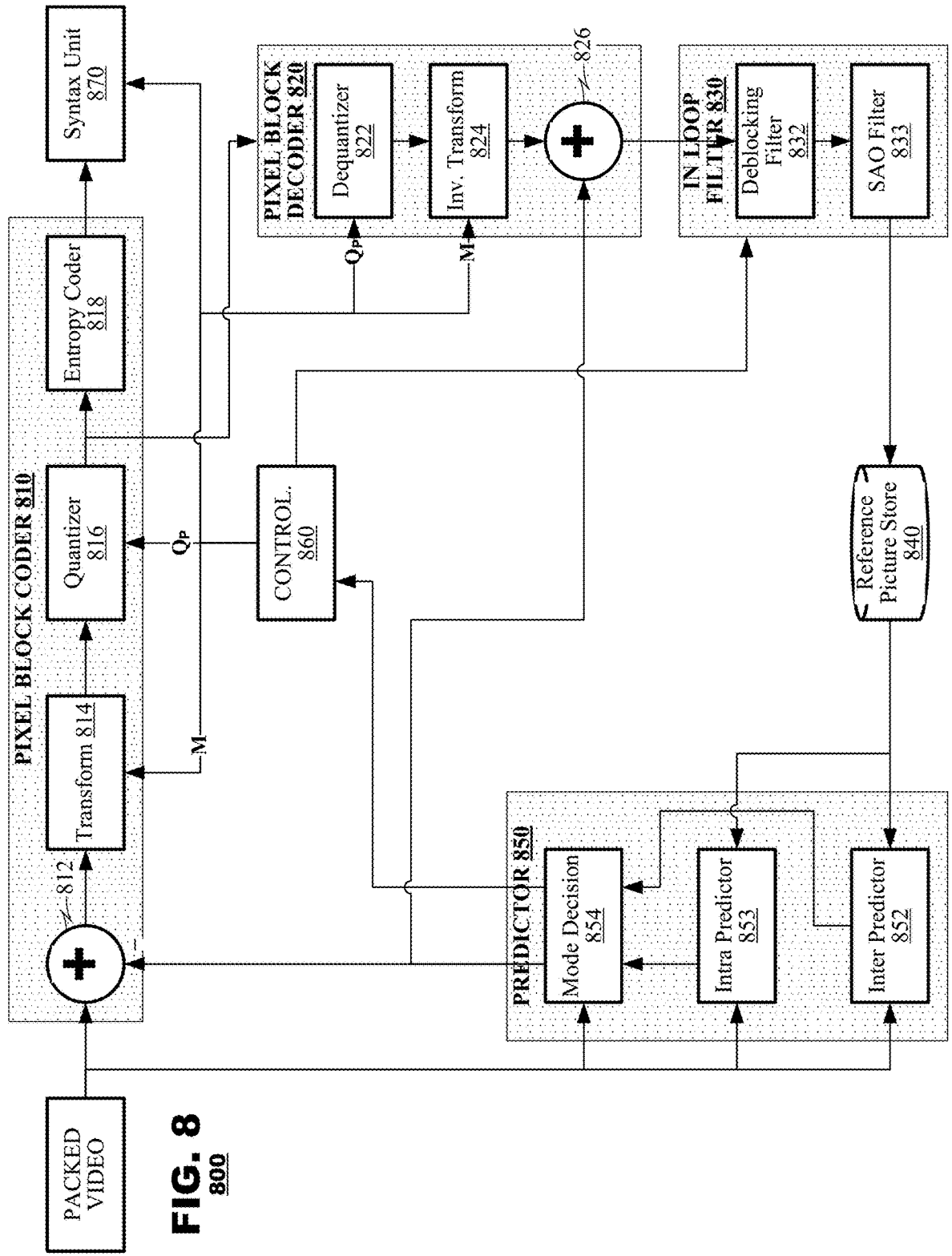
FIG. 8 is a functional block diagram of a coding system according to an embodiment of the present disclosure.

FIG. 8 is a functional block diagram of a coding system 800 according to an embodiment of the present disclosure. The system 800 may include a pixel block coder 810, a pixel block decoder 820, an in-loop filter system 830, a reference picture store 840, a predictor 850, a controller 860, and a syntax unit 870. The pixel block coder and decoder 810, 820 and the predictor 850 may operate iteratively on individual pixel blocks of a picture. The predictor 850 may predict data for use during coding of a newly-presented input pixel block. The pixel block coder 810 may code the new pixel block by predictive coding techniques and present coded pixel block data to the syntax unit 870. The pixel block decoder 820 may decode the coded pixel block data, generating decoded pixel block data therefrom. The in-loop filter 830 may perform various filtering operations on a decoded picture that is assembled from the decoded pixel blocks obtained by the pixel block decoder 820. The filtered picture may be stored in the reference picture store 840 where it may be used as a source of prediction of a later-received pixel block. The syntax unit 870 may assemble a data stream from the coded pixel block data which conforms to a governing coding protocol.

The pixel block coder 810 may include a subtractor 812, a transform unit 814, a quantizer 816, and an entropy coder 818. The pixel block coder 810 may accept pixel blocks of input data at the subtractor 812. The subtractor 812 may receive predicted pixel blocks from the predictor 850 and generate an array of pixel residuals therefrom representing a difference between the input pixel block and the predicted pixel block. The transform unit 814 may apply a transform to the sample data output from the subtractor 812, to convert data from the pixel domain to a domain of transform coefficients. The quantizer 816 may perform quantization of transform coefficients output by the transform unit 814. The quantizer 816 may be a uniform or a non-uniform quantizer. The entropy coder 818 may reduce bandwidth of the output of the coefficient quantizer by coding the output, for example, by variable length code words.

The transform unit 814 may operate in a variety of transform modes as determined by the controller 860. For example, the transform unit 814 may apply a discrete cosine transform (DCT), a discrete sine transform (DST), a Walsh-Hadamard transform, a Haar transform, a Daubechies wavelet transform, or the like. In an embodiment, the controller 860 may select a coding mode M to be applied by the transform unit 815, may configure the transform unit 815 accordingly and may signal the coding mode M in the coded video data, either expressly or impliedly.

The quantizer 816 may operate according to a quantization parameter $Q_P$ that is supplied by the controller 860. In an embodiment, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 818, as its name implies, may perform entropy coding of data output from the quantizer 816. For example, the entropy coder 818 may perform run length coding, Huffman coding, Golomb coding and the like.

The pixel block decoder 820 may invert coding operations of the pixel block coder 810. For example, the pixel block decoder 820 may include a dequantizer 822, an inverse transform unit 824, and an adder 826. The pixel block decoder 820 may take its input data from an output of the quantizer 816. Although permissible, the pixel block decoder 820 need not perform entropy decoding of entropy-coded data since entropy coding is a lossless event. The dequantizer 822 may invert operations of the quantizer 816 of the pixel block coder 810. The dequantizer 822 may perform uniform or non-uniform de-quantization as specified by the decoded signal $Q_P$. Similarly, the inverse transform unit 824 may invert operations of the transform unit 814. The dequantizer 822 and the inverse transform unit 824 may use the same quantization parameters $Q_P$ and transform mode M as their counterparts in the pixel block coder 810. Quantization operations likely will truncate data in various respects and, therefore, data recovered by the dequantizer 822 likely will possess coding errors when compared to the data presented to the quantizer 816 in the pixel block coder 810.

The adder 826 may invert operations performed by the subtractor 812. It may receive the same prediction pixel block from the predictor 850 that the subtractor 812 used in generating residual signals. The adder 826 may add the prediction pixel block to reconstructed residual values output by the inverse transform unit 824 and may output reconstructed pixel block data.

The in-loop filter 830 may perform various filtering operations on recovered pixel block data. For example, the in-loop filter 830 may include a deblocking filter 832 and a sample adaptive offset ("SAO") filter 833. The deblocking filter 832 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 830 may operate according to parameters that are selected by the controller 860.

The reference picture store 840 may store filtered pixel data for use in later prediction of other pixel blocks. Different types of prediction data are made available to the predictor 850 for different prediction modes. For example, for an input pixel block, intra prediction takes a prediction reference from decoded data of the same picture in which the input pixel block is located. Thus, the reference picture store 840 may store decoded pixel block data of each picture as it is coded. For the same input pixel block, inter prediction may take a prediction reference from previously coded and decoded picture(s) that are designated as reference pictures. Thus, the reference picture store 840 may store these decoded reference pictures.

As discussed, the predictor 850 may supply prediction data to the pixel block coder 810 for use in generating residuals. The predictor 850 may include an inter predictor 852, an intra predictor 853 and a mode decision unit 852. The inter predictor 852 may receive pixel block data representing a new pixel block to be coded and may search reference picture data from store 840 for pixel block data from reference picture(s) for use in coding the input pixel block. The inter predictor 852 may support a plurality of prediction modes, such as P mode coding and B mode coding. The inter predictor 852 may select an inter prediction mode and an identification of candidate prediction reference data that provides a closest match to the input pixel block being coded. The inter predictor 852 may generate prediction reference metadata, such as motion vectors, to identify which portion(s) of which reference pictures were selected as source(s) of prediction for the input pixel block.

The intra predictor 853 may support Intra (I) mode coding. The intra predictor 853 may search from among pixel block data from the same picture as the pixel block being coded that provides a closest match to the input pixel block. The intra predictor 853 also may generate prediction reference indicators to identify which portion of the picture was selected as a source of prediction for the input pixel block.

The mode decision unit 852 may select a final coding mode to be applied to the input pixel block. Typically, as described above, the mode decision unit 852 selects the prediction mode that will achieve the lowest distortion when video is decoded given a target bitrate. Exceptions may arise when coding modes are selected to satisfy other policies to which the coding system 800 adheres, such as satisfying a particular channel behavior, or supporting random access or data refresh policies. When the mode decision selects the final coding mode, the mode decision unit 852 may output a selected reference block from the store 840 to the pixel block coder and decoder 810, 820 and may supply to the controller 860 an identification of the selected prediction mode along with the prediction reference indicators corresponding to the selected mode.

The controller 860 may control overall operation of the coding system 800. The controller 860 may select operational parameters for the pixel block coder 810 and the predictor 850 based on analyses of input pixel blocks and also external constraints, such as coding bitrate targets and other operational parameters. As is relevant to the present discussion, when it selects quantization parameters $Q_P$, the use of uniform or non-uniform quantizers, and/or the transform mode M, it may provide those parameters to the syntax unit 870, which may include data representing those parameters in the data stream of coded video data output by the system 800. The controller 860 also may select between different modes of operation by which the system may generate reference images and may include metadata identifying the modes selected for each portion of coded data.

During operation, the controller 860 may revise operational parameters of the quantizer 816 and the transform unit 815 at different granularities of image data, either on a per pixel block basis or on a larger granularity (for example, per picture, per slice, per largest coding unit ("LCU") or another region). In an embodiment, the quantization parameters may be revised on a per-pixel basis within a coded picture.

Additionally, as discussed, the controller 860 may control operation of the in-loop filter 830 and the prediction unit 850. Such control may include, for the prediction unit 850, mode selection (lambda, modes to be tested, search windows, distortion strategies, etc.), and, for the in-loop filter 830, selection of filter parameters, reordering parameters, weighted prediction, etc.

And, further, the controller 860 may perform transforms of reference pictures stored in the reference picture store when new packing configurations are defined for input video.

The principles of the present discussion may be used cooperatively with other coding operations that have been proposed for multi-view video. For example, the predictor 850 may perform prediction searches using input pixel block data and reference pixel block data in a spherical projection. Operation of such prediction techniques are may be performed as described in U.S. patent application Ser. No. 15/390,202, filed Dec. 23, 2016 and U.S. patent application Ser. No. 15/443,342, filed Feb. 27, 2017, both of which are assigned to the assignee of the present application, the disclosures of which are incorporated herein by reference. In such an embodiment, the coder 800 may include a spherical transform unit 890 that transforms input pixel block data to a spherical domain prior to being input to the predictor 850.

As indicated, the coded video data output by the video coder 230 should consume less bandwidth than the input data when transmitted and/or stored. The coding system 200 may output the coded video data to an output device 270, such as a transmitter, that may transmit the coded video data across a communication network 130 (FIG. 1). Alternatively, the coding system 200 may output coded data to a storage device (not shown) such as an electronic-, magnetic- and/or optical storage medium.

Figure 9:
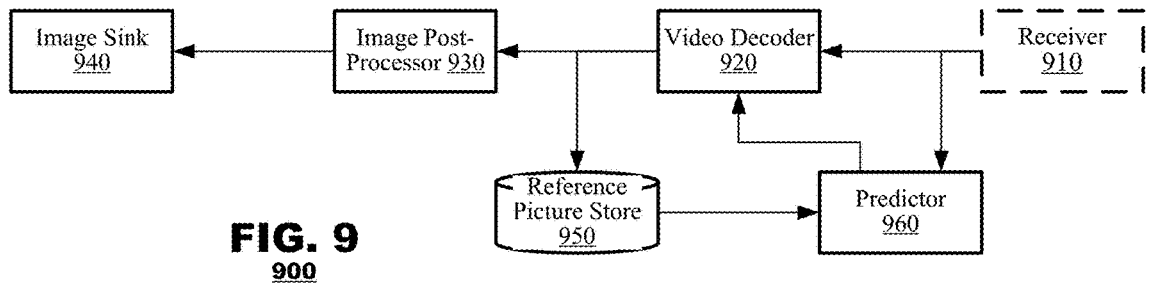
FIG. 9 is a functional block diagram of a decoding system according to an embodiment of the present disclosure.

FIG. 9 is a functional block diagram of a decoding system 900 according to an embodiment of the present disclosure. The decoding system 900 may include a receiver 910, a video decoder 920, an image processor 930, a video sink 940, a reference picture store 950 and a predictor 960. The receiver 910 may receive coded video data from a channel and route it to the video decoder 920. The video decoder 920 may decode the coded video data with reference to prediction data supplied by the predictor 960.

The predictor 960 may receive prediction metadata in the coded video data, retrieve content from the reference picture store 950 in response thereto, and provide the retrieved prediction content to the video decoder 920 for use in decoding.

The video sink 940, as indicated, may consume decoded video generated by the decoding system 900. Video sinks 940 may be embodied by, for example, display devices that render decoded video. In other applications, video sinks 940 may be embodied by computer applications, for example, gaming applications, virtual reality applications and/or video editing applications, that integrate the decoded video into their content. In some applications, a video sink may process the entire multi-view field of view of the decoded video for its application but, in other applications, a video sink 940 may process a selected sub-set of content from the decoded video. For example, when rendering decoded video on a flat panel display, it may be sufficient to display only a selected sub-set of the multi-view video. In another application, decoded video may be rendered in a multi-view format, for example, in a planetarium.

Figure 10:
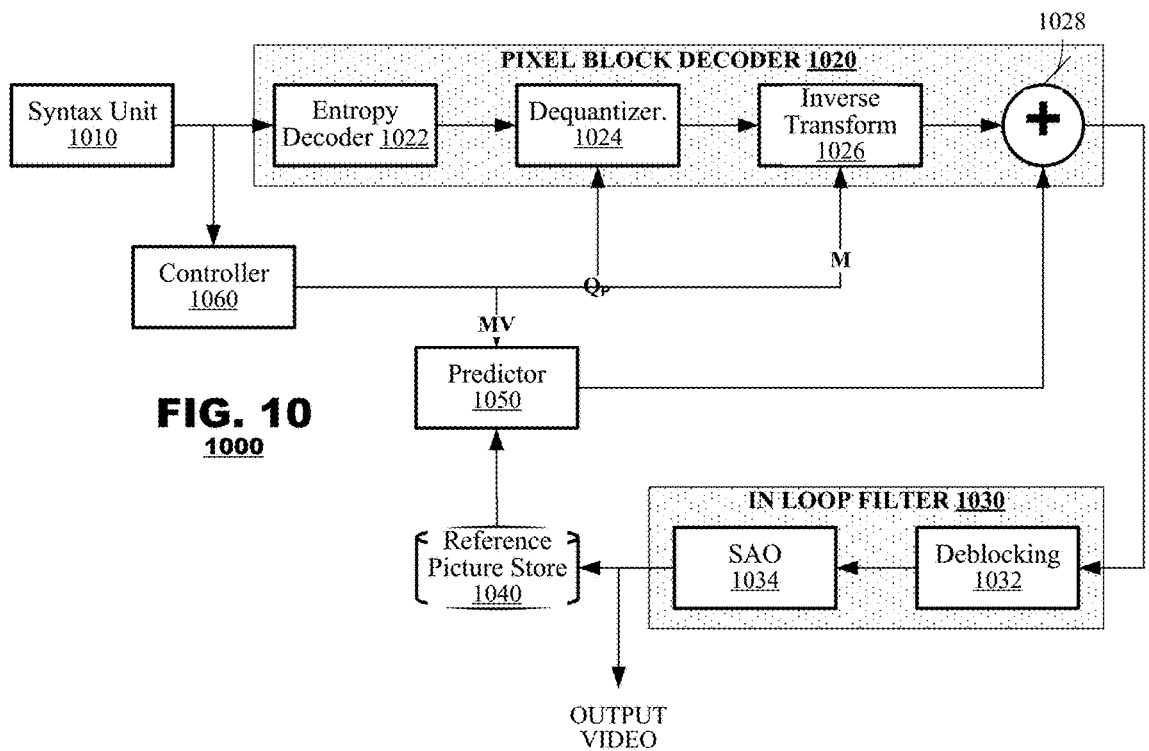
FIG. 10 is a functional block diagram of a decoding system according to an embodiment of the present disclosure.

FIG. 10 is a functional block diagram of a decoding system 1000 according to an embodiment of the present disclosure. The decoding system 1000 may include a syntax unit 1010, a pixel block decoder 1020, an in-loop filter 1030, a reference picture store 1040, a predictor 1050, and a controller 1060. The syntax unit 1010 may receive a coded video data stream and may parse the coded data into its constituent parts. Data representing coding parameters may be furnished to the controller 1060 while data representing coded residuals (the data output by the pixel block coder 810 of FIG. 8) may be furnished to the pixel block decoder 1020. The pixel block decoder 1020 may invert coding operations provided by the pixel block coder 810 (FIG. 8). The in-loop filter 1030 may filter reconstructed pixel block data. The reconstructed pixel block data may be assembled into pictures for display and output from the decoding system 1000 as output video. The pictures also may be stored in the prediction buffer 1040 for use in prediction operations. The predictor 1050 may supply prediction data to the pixel block decoder 1020 as determined by coding data received in the coded video data stream.

The pixel block decoder 1020 may include an entropy decoder 1022, a dequantizer 1024, an inverse transform unit 1026, and an adder 1028. The entropy decoder 1022 may perform entropy decoding to invert processes performed by the entropy coder 818 (FIG. 8). The dequantizer 1024 may invert operations of the quantizer 1016 of the pixel block coder 810 (FIG. 8). Similarly, the inverse transform unit 1026 may invert operations of the transform unit 814 (FIG. 8). They may use the quantization parameters $Q_P$ and transform modes M that are provided in the coded video data stream. Because quantization is likely to truncate data, the data recovered by the dequantizer 1024, likely will possess coding errors when compared to the input data presented to its counterpart quantizer 1016 in the pixel block coder 810 (FIG. 8).

The adder 1028 may invert operations performed by the subtractor 810 (FIG. 8). It may receive a prediction pixel block from the predictor 1050 as determined by prediction references in the coded video data stream. The adder 1028 may add the prediction pixel block to reconstructed residual values output by the inverse transform unit 1026 and may output reconstructed pixel block data.

The in-loop filter 1030 may perform various filtering operations on reconstructed pixel block data. As illustrated, the in-loop filter 1030 may include a deblocking filter 1032 and an SAO filter 1034. The deblocking filter 1032 may filter data at seams between reconstructed pixel blocks to reduce discontinuities between the pixel blocks that arise due to coding. SAO filters 1034 may add offset to pixel values according to an SAO type, for example, based on edge direction/shape and/or pixel level. Other types of in-loop filters may also be used in a similar manner. Operation of the deblocking filter 1032 and the SAO filter 1034 ideally would mimic operation of their counterparts in the coding system 800 (FIG. 8). Thus, in the absence of transmission errors or other abnormalities, the decoded picture obtained from the in-loop filter 1030 of the decoding system 1000 would be the same as the decoded picture obtained from the in-loop filter 810 of the coding system 800 (FIG. 8); in this manner, the coding system 800 and the decoding system 1000 should store a common set of reference pictures in their respective reference picture stores 840, 1040.

The reference picture store 1040 may store filtered pixel data for use in later prediction of other pixel blocks. The reference picture store 1040 may store decoded pixel block data of each picture as it is coded for use in intra prediction. The reference picture store 1040 also may store decoded reference pictures.

As discussed, the predictor 1050 may supply the transformed reference block data to the pixel block decoder 1020. The predictor 1050 may supply predicted pixel block data as determined by the prediction reference indicators supplied in the coded video data stream.

The controller 1060 may control overall operation of the coding system 1000. The controller 1060 may set operational parameters for the pixel block decoder 1020 and the predictor 1050 based on parameters received in the coded video data stream. As is relevant to the present discussion, these operational parameters may include quantization parameters $Q_P$ for the dequantizer 1024 and transform modes M for the inverse transform unit 1010. As discussed, the received parameters may be set at various granularities of image data, for example, on a per pixel block basis, a per picture basis, a per slice basis, a per LCU basis, or based on other types of regions defined for the input image.

And, further, the controller 1060 may perform transforms of reference pictures stored in the reference picture store 1040 when new packing configurations are detected in coded video data.

The foregoing discussion has described operation of the embodiments of the present disclosure in the context of video coders and decoders. Commonly, these components are provided as electronic devices. Video decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic-and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Figure 11:
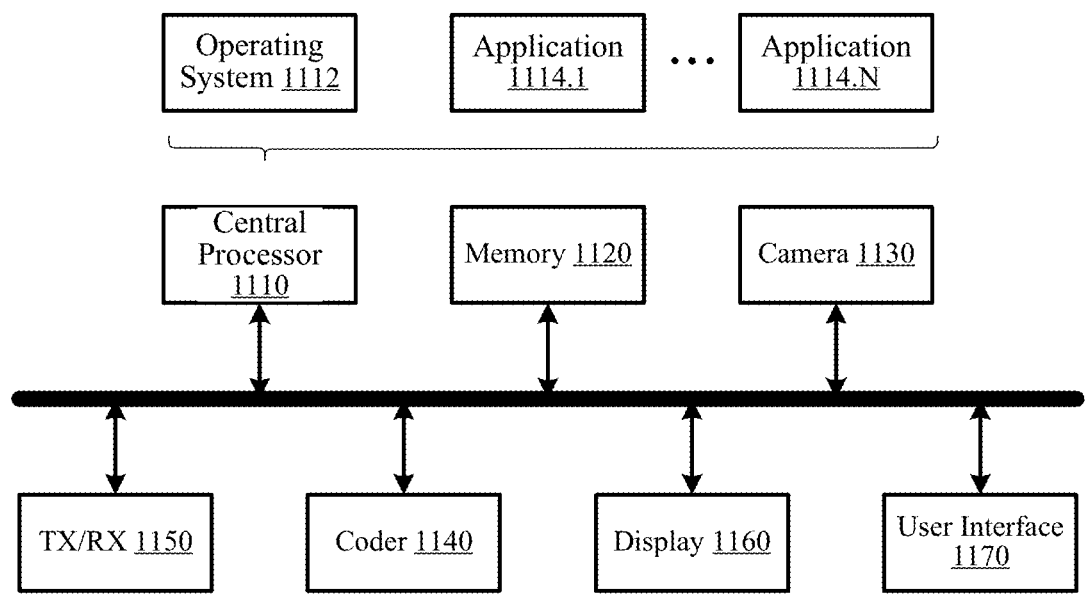
FIG. 11 illustrates an exemplary computer system that may perform such techniques.

For example, the techniques described herein may be performed by a central processor of a computer system. FIG. 11 illustrates an exemplary computer system 1100 that may perform such techniques. The computer system 1100 may include a central processor 1110 and a memory 1120. The central processor 1110 may read and execute various program instructions stored in the memory 1120 that define an operating system 1112 of the system 1100 and various applications 1114.1-1114.N. The program instructions may cause the processor to perform image processing, including the object tracking and view shift techniques described hereinabove. They also may cause the processor to perform video coding also as described herein. As it executes those program instructions, the central processor 1110 may read, from the memory 1120, image data representing the multi-view image and may create extracted video that is return to the memory 1120.

As indicated, the memory 1120 may store program instructions that, when executed, cause the processor to perform the techniques described hereinabove. The memory 1120 may store the program instructions on electrical-, magnetic- and/or optically-based storage media.

The system 1100 may possess other components as may be consistent with the system's role as an image source device, an image sink device or both. Thus, in a role as an image source device, the system 1100 may possess one or more cameras 1130 that generate the multi-view video. The system 1100 also may possess a coder 1140 to perform video coding on the video and a transmitter 1150 (shown as TX) to transmit data out from the system 1100. The coder 1150 may be provided as a hardware device (e.g., a processing circuit separate from the central processor 1100) or it may be provided in software as an application 1114.1.

In a role as an image sink device, the system 1100 may possess a receiver 1150 (shown as RX), a coder 1140, a display 1160 and user interface elements 1170. The receiver 1150 may receive data and the coder 1140 may decode the data. The display 1160 may be a display device on which content of the view window is rendered. The user interface 1170 may include component devices (such as motion sensors, touch screen inputs, keyboard inputs, remote control inputs and/or controller inputs) through which operators input data to the system 1100.

Several embodiments of the present disclosure are specifically illustrated and described herein. However, it will be appreciated that modifications and variations of the present disclosure are covered by the above teachings and within the purview of the appended claims without departing from the spirit and intended scope of the disclosure.

We claim:

1. A method of displaying video, comprising:
   identifying an object from a first portion of multi-view video content corresponding to a location in an image space of the multi-view video of a display window location for a display device at a first time;
   tracking a location of the object across a video sequence of the multi-view video content;
   determining a location of a view window in the image space based on the tracked location of the object at a second time;
   when the location of the view window at the second time is inconsistent with a location of the display window at the second time, identifying a new object in a second portion of the multi-view video content corresponding to the display window location at the second time, and designating the new object as the object for future tracking;
   extracting from the video sequence a portion of multi-view video content contained within the view window;
   performing video compression on the extracted video; and transmitting the extracted video in compressed form to the display device.

2. The method of claim 1, wherein the image space is a spherical projection of image data.

3. The method of claim 1, wherein the image space is an equirectangular image.

4. The method of claim 1, further comprising, before the identifying of the object from the first portion, retrieving the multi-view video from storage.

5. The method of claim 1, further comprising,
buffering a portion of the multi-view video, and
performing the tracking across the buffered multi-view video,
wherein the view window is shifted and zoomed based on tracking across the buffered multi-view video.

6. The method of claim 1, wherein the identifying of the new object in the second portion is performed in response to an operator input at the display device.

7. The method of claim 1, wherein the identifying of the object from the first portion is performed in response to input from an author of the multi-view video.

8. The method of claim 1, further comprising:
estimating an amount of motion of the tracked object,
wherein, based on the amount of motion, the view window includes a shift in zoom of image content extracted from the multi-view video.

9. The method of claim 1, further comprising:
estimating an orientation of the display device,
wherein the view window aligns an orientation of image content from the multi-view video with the orientation of the display device.

10. The method of claim 1, wherein the first portion correspond to a display window of the display device at an initial time, and further comprising:
when the view window location is inconsistent with an updated display window of the display device at a later time, identifying a new object from the updated display window, tracking a location of the new object, and determining the view window location based on the tracked location of the new object.

11. The method of claim 1, wherein:
the display window location at the first time is identified by a user of a display device receiving the extracted video at the first time; and
the display window location at the second time is identified by the user of the display device at the second time later than the first time.

12. The method of claim 1, wherein the identifying an object at the first time identifies a plurality of objects at the first time, and the method further comprises:
selecting a first object from the plurality of objects, wherein
the tracking of the location of the object tracks the location of the first object,
the determining the location of the view window at the second time is based on the tracked location of the first object, and
the identified new object for future tracking is a second object selected from the plurality of objects at the first time.

13. A non-transitory computer readable medium storing program instructions that, when executed, cause a process device to execute a method that comprises:
identifying an object from a first portion of multi-view video content corresponding to a location in an image space of the multi-view video of a display window location for a display device at a first time;
tracking a location of the object across a video sequence of the multi-view video content;
determining a location of a view window in the image space based on the tracked location of the object at a second time;
when the location of the view window at the second time is inconsistent with a location of the display window at the second time, identifying a new object in a second portion of the multi-view video content corresponding to the display window location at the second time, and designating the new object as the object for future tracking;
extracting from the video sequence a portion of multi-view video content contained within the view window;
performing video compression on the extracted video; and
transmitting the extracted video in compressed form to the display device.

14. The medium of claim 13, wherein the image space is a spherical projection of image data.

15. The medium of claim 13, wherein the image space is an equirectangular image.

16. The medium of claim 13, wherein the method further comprises:
buffering a portion of the multi-view video, and
performing the tracking across the buffered multi-view video,
wherein the view window is shifted and zoomed based on tracking across the buffered multi-view video.

17. The medium of claim 13, wherein the identifying of the new object in the second portion is performed in response to an operator input at the display device.

18. The medium of claim 13, wherein the identifying of the object from the first portion is performed in response to input from an author of the multi-view video.

19. The medium of claim 13, wherein the method further comprises:
estimating an amount of motion of the tracked object,
wherein, based on the amount of motion, the view window includes a shift in zoom of image content extracted from the multi-view video.

20. The medium of claim 13, wherein the method further comprises:
estimating an orientation of the display device,
wherein the view window aligns an orientation of image content from the multi-view video with the orientation of the display device.

21. Apparatus comprising:
a receiver having an output for multi-view video;
a processor having an input for the multi-view video, to
identify, from data representing an orientation of the apparatus with respect to gravity, an object from a first portion of the multi-view video content corresponding to a location in an image space of the multi-view video of a display window of the apparatus at a first time,
track a location of the object across a video sequence of the multi-view video content,
determining a location of a view window in the image space based on the tracked location of the object at a second time and the identified orientation,
when the view window location at the second time is inconsistent with a location of the display window at a second time, identify a new object in a second portion of the multi-view video content corresponding to the display window location at the second time and designate the new object as the object for future tracking, extract from the video sequence a portion of the multi-video video content contained within the view window, and a display having an input for the extracted video.

22. Apparatus comprising:
an image source having an output for multi-view video;
a processor having an input for the multi-view video, to
  identify an object from a first portion of the multi-view video content corresponding to a first location of a display window at a first video time,
  track a location of the object across a video sequence of the multi-view video content,
  estimate an orientation of a display device with respect to gravity,
  determine a view window in an image space of the multi-view video based on the tracked location of the object and the estimated orientation,
  when the view window location is inconsistent with an updated location of the display window at a second video time after the first video time, identify a new object from the updated location and designate the new object as the object for future tracking;
  extract from the video sequence a sub-set of the video contained within the view window, and
  perform video compression on the extracted video,
an output device for the extracted video in compressed form.

* * * * *